US009456002B2

(12) United States Patent
Kelson et al.

(10) Patent No.: US 9,456,002 B2
(45) Date of Patent: *Sep. 27, 2016

(54) SELECTIVE MODIFICATION OF ENCRYPTED APPLICATION LAYER DATA IN A TRANSPARENT SECURITY GATEWAY

(71) Applicant: Imperva, Inc., Redwood City, CA (US)

(72) Inventors: Ido Kelson, Tel-Aviv (IL); Dmitry Babich, Ramat Gan (IL)

(73) Assignee: Imperva, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,012

(22) Filed: Aug. 21, 2015

(65) Prior Publication Data

US 2015/0381656 A1    Dec. 31, 2015

Related U.S. Application Data

(63) Continuation of application No. 14/081,726, filed on Nov. 15, 2013, now Pat. No. 9,148,446.

(60) Provisional application No. 61/820,609, filed on May 7, 2013.

(51) Int. Cl.
*H04L 29/06* (2006.01)
*H04L 29/08* (2006.01)

(52) U.S. Cl.
CPC ......... *H04L 63/168* (2013.01); *H04L 63/0281* (2013.01); *H04L 63/0428* (2013.01); *H04L 63/0435* (2013.01); *H04L 63/0471* (2013.01); *H04L 63/166* (2013.01); *H04L 63/20* (2013.01); *H04L 67/02* (2013.01)

(58) Field of Classification Search
CPC ...................................... H04L 63/168
USPC ........................................ 713/153
See application file for complete search history.

(56) References Cited

U.S. PATENT DOCUMENTS 6,084,969 A    7/2000    Wright et al.
7,277,963 B2  10/2007   Dolson et al.
(Continued)

OTHER PUBLICATIONS

"Information technology—Open Systems Interconnection—Basic Reference Model: The Basic Model", ISO/IEC 7498-1:1994(E), Second edition, Nov. 15, 1994, 68 pages.
(Continued)

*Primary Examiner* — Dant Shaifer Harriman
(74) *Attorney, Agent, or Firm* — NDWE LLP

(57) ABSTRACT

According to one embodiment, a transparent security gateway is coupled between a client end station (CES) and a web application server (WAS). The security gateway monitors an encryption protocol handshake between the CES and the WAS to capture, using a provided private key of the WAS, a generated symmetric key to be used for an encryption layer connection. Using the captured symmetric key, the security gateway receives an encrypted connection record of the encryption layer connection, decrypts the encrypted connection record to yield a plaintext connection record, modifies the plaintext connection record, encrypts the modified plaintext connection record using the symmetric key, and transmits one or more packets carrying the encrypted modification plaintext connection record instead of the received encrypted connection record such that neither the CES or WAS is aware of the modification of the encrypted data.

15 Claims, 15 Drawing Sheets

(56) References Cited

U.S. PATENT DOCUMENTS

| | | |
|---|---|---|
| 7,313,131 B2 | 12/2007 | O'Connor et al. |
| 7,953,820 B2 | 5/2011 | Stevens et al. |
| 8,112,435 B2 | 2/2012 | Epstein et al. |
| 8,155,108 B2 | 4/2012 | Mangin et al. |
| 2007/0025374 A1 | 2/2007 | Stefan et al. |
| 2014/0115322 A1 | 4/2014 | Xu et al. |
| 2015/0188895 A1 | 7/2015 | St-Germain et al. |

OTHER PUBLICATIONS

Dierks, T., et al., "The TLS Protocol", Version 1.0, RFC 2246, Jan. 1999, 81 pages.

Dierks, T., et al., "The Transport Layer Security (TLS) Protocol", Version 1.1, RFC 4346, Apr. 2006, 88 pages.

Dierks, T., et al., "The Transport Layer Security (TLS) Protocol", Version 1.2, RFC 5246, Aug. 2008, 105 pages.

Turner, S., et al., "Prohibiting Secure Sockets Layer (SSL)", Version 2.0, RFC 6176, Mar. 2011, 5 pages.

Non-Final Office Action, U.S. Appl. No. 14/833,013, dated Apr. 22, 2016, 17 pages.

R. Fielding et al., "Hypertext Transfer Protocol—HTTP/1.1," Jun. 1999, Network Working Group, Request for Comments: 2616, 150 pages, The Internet Society.

Final Office Action mailed on Aug. 4, 2016 for U.S. Appl. No. 14/833,013, filed on Aug. 21, 2015, 20 pages.

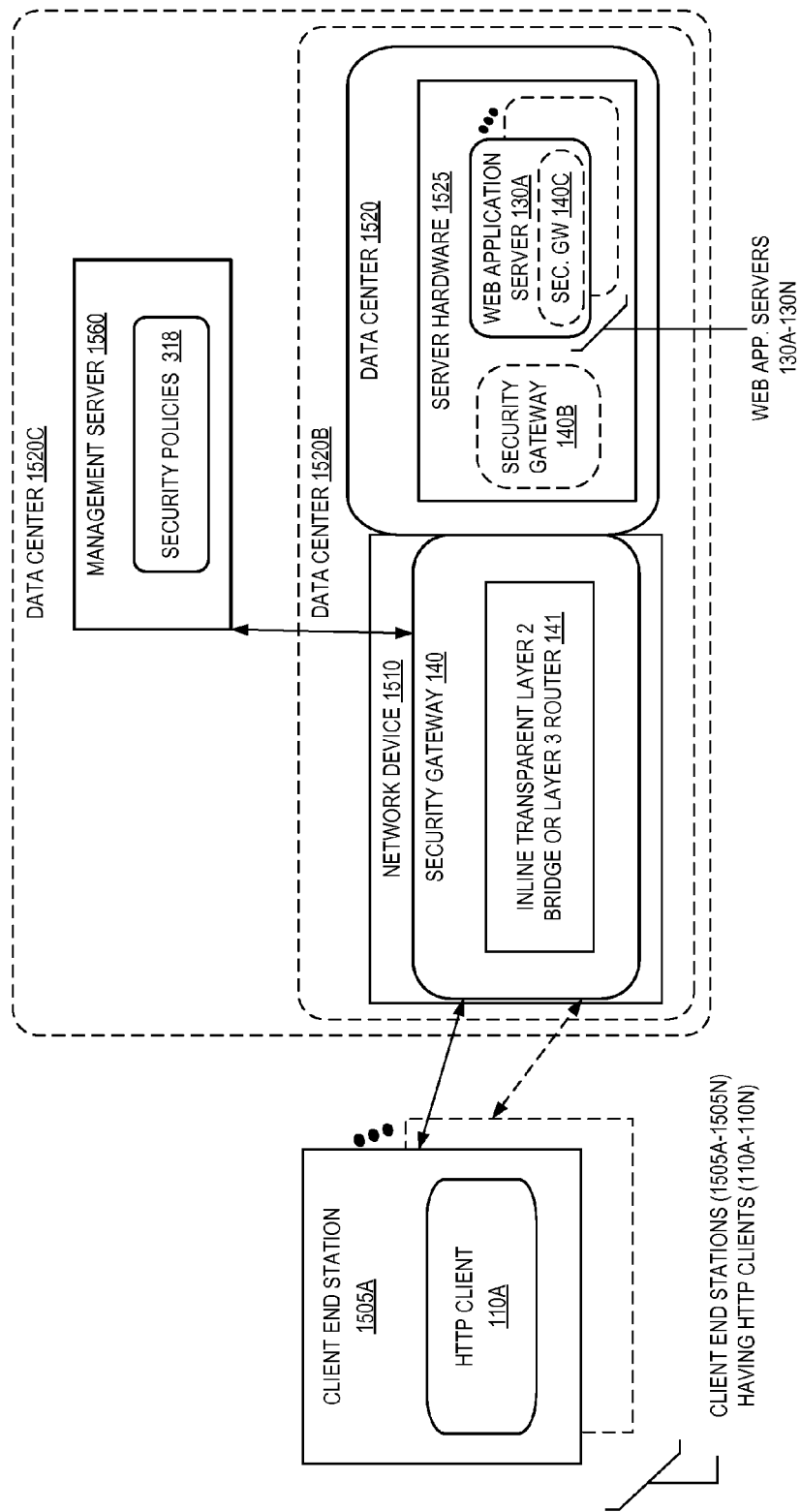

SELECTIVE MODIFICATION OF ENCRYPTED APPLICATION LAYER DATA IN A TRANSPARENT SECURITY GATEWAY

CROSS REFERENCE TO RELATED APPLICATIONS

This application is a continuation of U.S. application Ser. No. 14/081,726 filed on Nov. 15, 2013, which claims priority from U.S. Provisional Patent Application No. 61/820,609 filed on May 7, 2013, the content of which are both incorporated by reference.

FIELD

Embodiments of the invention relate to the field of networking; and more specifically, to selectively modifying encrypted application layer data in a transparent security gateway.

BACKGROUND

Transport Layer Security (TLS) and its predecessor, Secure Sockets Layer (SSL), are cryptographic protocols that provide communication security for data transmitted over the Internet. TLS and SSL utilize asymmetric cryptography for authentication during a key exchange, symmetric cryptography to encrypt application layer data, and message authentication codes (MACs) to ensure the integrity of each transmitted message. Many different versions of TLS and SSL are widely used for a variety of applications, including web browsing, electronic mail, instant messaging and voice-over-IP (VoIP). TLS is an Internet Engineering Task Force (IETF) standards track protocol, which was first defined in IETF Request for Comments (RFC) 2246 as TLS 1.0, updated in IETF RFC 4346 as TLS 1.1, and again updated as TLS 1.2 in both RFC 5246 and RFC 6176. TLS is based upon versions 1.0, 2.0, and 3.0 of SSL.

For the purposes of this disclosure, the term "encryption protocol" is used generically to describe TLS, SSL, or any other cryptographic protocol used for encrypting application layer data sent over a communications network (e.g., the Internet), and the term "encryption layer connection" is used to refer to communications between two electronic devices utilizing an encryption protocol.

Both the TLS and SSL encryption protocols utilize a "handshake" to generate a symmetric (session) key to be used for encrypting application layer data to be transmitted over the encryption layer connection. The handshake may include an exchange of multiple plaintext handshake messages between a client and a server, which results in both the client and the server generating a symmetric key. Then, the handshake terminates with each side transmitting an encrypted "finished" message indicating the completion of the handshake, and the encryption layer connection switches into a data exchange mode, where the client and server exchange encrypted application layer payloads. Accordingly, an "encryption layer connection" transmits "connection records" that include unencrypted handshake records, encrypted handshake records, and encrypted data records.

The Open Systems Interconnection (OSI) model (ISO/IEC 7498-1) was developed to establish standardization for linking heterogeneous communication systems, and describes the flow of information from a software application of a first electronic device to a software application of a second electronic device through a communications network. The OSI model has seven functional layers including a physical layer (layer 1), a data link layer (layer 2), a network layer (layer 3), a transport layer (layer 4), a session layer (layer 5), a presentation layer (layer 6), and an application layer (layer 7). Encryption protocols are typically described as being initialized at layer 5 (the session layer) and then operating at layer 6 (the presentation layer). First, the session layer is utilized to perform a handshake using an asymmetric cipher to establish cipher settings and a shared symmetric (session) key for that communication session (to establish the encryption layer connection). Then, the presentation layer is utilized to encrypt the application layer data for the rest of the communication session (the established encryption layer connection) using a negotiated symmetric cipher and the established shared symmetric key. Some examples of application layer data of application layer protocols that can be encrypted include, but are not limited to, Hypertext Transfer Protocol (HTTP) for web application communication, File Transfer Protocol (FTP) for file transmission, Internet Message Access Protocol (IMAP) and Post Office Protocol (POP) for receiving email, Simple Mail Transfer Protocol (SMTP) for transmitting email, Internet Relay Chat (IRC) for real-time Internet text messaging, Session Initiation Protocol (SIP) for voice and video calling, Network News Transfer Protocol (NNTP) for transporting news articles, Extensible Messaging and Presence Protocol (XMPP) for messaging, and Network File System (NFS) for the remote access of files.

Security gateways, such as firewalls and web application firewalls (WAFs), are network security systems that protect software applications (e.g., web application servers) executing on electronic devices (e.g., server end stations) within a network by controlling the flow of network traffic passing through the security gateway. By analyzing packets flowing through the security gateway and determining whether those packets should be allowed to continue traveling through the network, the security gateway can prevent malicious traffic from reaching a protected application. Security gateways may be implemented using a dedicated network device, a shared network device, or another type of electronic device and can be software, hardware, or a combination of both.

Security gateways are sometimes deployed as transparent inline bridges or routers. Transparent inline bridges and routers are placed between clients and servers, but are "transparent" to both the clients and servers. Thus, packets sent by a client to a server will arrive at the security gateway, be analyzed by the security gateway, and be blocked or forwarded on to the server when the packets are deemed acceptable by the security gateway.

Accordingly, in transparent security gateway deployments, a client forms a communication connection directly with the server. Thus, in the case of secure websites using an encryption layer connection, a client forms the encryption layer connection directly with the server.

BRIEF DESCRIPTION OF THE DRAWINGS

The invention may best be understood by referring to the following description and accompanying drawings that are used to illustrate embodiments of the invention. In the drawings:

FIG. 15 illustrates an exemplary deployment environment of a security gateway operating as an inline transparent layer 2 bridge or layer 3 router and operable to selectively modify encrypted application layer data transported over encryption layer connections according to certain embodiments of the invention.

DESCRIPTION OF EMBODIMENTS

Figure 1:
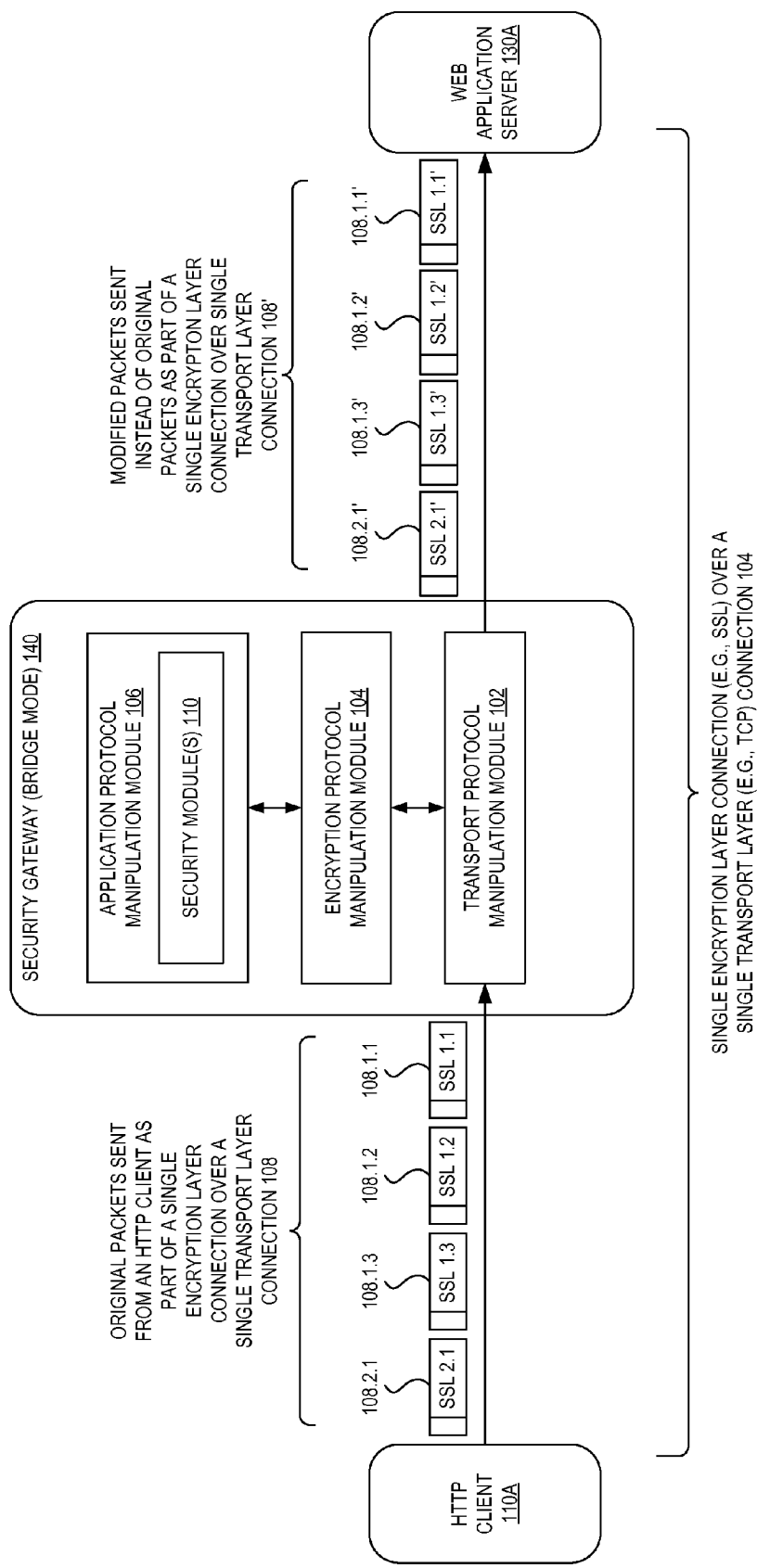
FIG. 1 is a block diagram illustrating a transparent security gateway operable to selectively modify encrypted application layer data transmitted over encryption layer connections according to certain embodiments of the invention.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks; optical disks; random access memory (RAM); read only memory (ROM); flash memory devices; phase-change memory) and transitory computer-readable communication media (e.g., electrical, optical, acoustical or other form of propagated signals, such as carrier waves, infrared signals, digital signals). In addition, such electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media of a given electronic device typically stores code (i.e., instructions) for execution on the set of one or more processors of that electronic device. Of course, one or more parts of an embodiment of the invention may be implemented using different combinations of software, firmware, and/or hardware.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video). Client end stations (e.g., workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) may execute an HTTP client (e.g., a web browser) to access content and/or services provided over a LAN, over the Internet, and/or over virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public web pages (e.g., free content, store fronts, search services), private web pages (e.g., username/password accessed web pages providing email services), and/or corporate networks over VPNs.

A web application server is system software (running on top of an operating system) executed by server hardware upon which web applications run. Web application servers may include a web server (e.g. Apache, Microsoft® Internet Information Server (IIS), nginx, lighttpd), which delivers web pages upon the request of HTTP clients (i.e., software executing on an end station) using HTTP, and may also include an application server that executes procedures (i.e., programs, routines, scripts) of a web application. Web application servers typically include web server connectors, computer programming language libraries, runtime libraries, database connectors, and/or the administration code needed to deploy, configure, manage, and connect these components. Web applications are computer software applications made up of one or more files including computer code that run on top of web application servers and are written in a language the web application server supports. Web applications are typically designed to interact with HTTP clients by dynamically generating HTML responsive to HTTP request messages sent by those HTTP clients. Many web applications utilize databases (e.g., relational databases such as PostgreSQL, MySQL, and Oracle, and non-relational databases, also known as NoSQL databases, such as MongoDB, Riak, CouchDB, Apache Cassandra and HBase) to store information received from HTTP clients and/or information to be displayed to HTTP clients.

HTTP clients are often executed on client end stations that are located outside of the LAN of the security gateway and web application servers, and that are being utilized by users (i.e., persons, including end users of a service and/or administrative users) to access the content and/or services provided by the web application servers. In some embodiments HTTP clients may be executed on client end stations located within the same LAN as the security gateway and web application servers to access those web application servers.

HTTP clients interact with web applications by transmitting HTTP request messages to web application servers, which execute portions of web applications and return web application data in the form of HTTP response messages back to the HTTP clients, where the web application data may be rendered using a web browser. Thus, HTTP functions as a request-response protocol in a client-server computing model, where the web application servers typically act as the "server" and the HTTP clients typically act as the "client."

HTTP Resources are identified and located on a network by Uniform Resource Identifiers (URIs)—or, more specifically, Uniform Resource Locators (URLs)—using the HTTP or HTTP Secure (HTTPS) URI schemes. URLs are specific strings of characters that identify a particular reference available using the Internet. URLs typically contain a protocol identifier or scheme name (e.g. http/https/ftp, a colon, two slashes, and one or more of user credentials, server name, domain name, Internet Protocol (IP) address, port, resource path, query string, and fragment identifier, which may be separated by periods and/or slashes. The original versions of HTTP—HTTP/0.9 and HTTP/1.0—were revised in IETF RFC 2616 as HTTP/1.1, which is in common use today. A new version of the HTTP protocol, HTTP/2.0, is currently being developed by the Hypertext Transfer Protocol Bis (httpbis) working group of the IETF and is based upon the SPDY protocol. As HTTP/2.0 is expected to similarly utilize HTTP clients and HTTP request messages, the invention discussed herein should largely (if not entirely) remain applicable to HTTP/2.0.

Embodiments of the invention provide methods, apparatuses, and systems to selectively modify application layer data, including but not limited to HTTP headers and/or HTML pages, inside encryption layer connections (e.g., TLS, SSL) passing through a security gateway configured as a transparent bridge or router, such that the security gateway is not an end point of the encryption layer connections and thus does not terminate the encryption layer connections or the underlying transport layer (e.g., Transmission Control Protocol (TCP)) connections. Using embodiments of the invention, the security gateway can provide additional security for a protected web application server by adding data into the originally transmitted application layer data (e.g., adding JavaScript code to an HTML response to test a browser for malware), removing data from the originally transmitted application layer data (e.g., removing HTTP headers identifying the protected server), replacing data from the originally transmitted application layer data (e.g., masking sensitive data such as a credit card number or social security number, etc.), and/or modifying aspects of an encryption protocol handshake (e.g., removing weak ciphers suggested by the client). However, embodiments of the invention are also useful for modifying other types of application layer data transmitted using an encryption layer connection, which are not limited to HTTP and HTML data but may include, for example, database data such as Structured Query Language (SQL) commands and result sets, application server data (web or otherwise) such as data in JavaScript Object Notation (JSON) or Extensible Markup Language (XML) format, audio and/or visual data, binary data, or any other type of application layer data.

A LAN including the security gateway and/or server end stations may be controlled and/or operated by an enterprise. An enterprise is a business, organization, governmental body, or other collective body utilizing or providing the content and/or services of the server end stations. Some users are deemed enterprise users, which are those users explicitly or implicitly a part of the enterprise. Enterprise users typically access the content and/or services of the server end stations from within a same LAN as the server end stations, though enterprise users may also utilize VPNs to access the LAN of the server end stations and/or access the server end stations across the public Internet. Enterprise users typically have a user account that allows access to the client end stations, LAN, and/or the content and/or services provided by the server end stations.

Attackers are entities attempting to access or use resources of the LAN and/or end stations within the LAN (server end stations, client end stations) without permission and/or for illegitimate or malicious purposes. Attackers typically utilize client end stations located outside of the LAN, but in some embodiments attackers could be enterprise users acting outside the scope of their typical or permitted enterprise duties, unknown users from within the LAN, compromised client end stations within the LAN (e.g., infected with malware/viruses, infected with spyware, under the control of external or remote users, accessed improperly), or applications executing on end stations that are buggy or malicious.

Overview of Selective Modification of Encrypted Application Layer Data in a Transparent Security Gateway FIG. 1 is a block diagram illustrating a transparent security gateway 140 operable to selectively modify encrypted application layer data transmitted over encryption layer connections according to certain embodiments of the invention. In FIG. 1, the security gateway 140 includes a transport protocol manipulation module 102 operable to receive packets 108 (e.g., 108.1.1, 108.1.2, 108.1.3, 108.2.1, etc.) sent from an HTTP client 110A as part of an encryption layer connection using a transport layer connection 104, send those packets to an encryption protocol manipulation module 104, and selectively transmit the original packets (108.1.1, 108.1.2, 108.1.3, 108.2.1) or modified packets 108' (e.g., 108.1.1', 108.1.2', 108.1.3', 108.2.1') instead of the original packets 108 to a web application server 130A. Accordingly, the HTTP client 110A forms a communication connection directly with the WAS 130A. Thus, in the case of secure websites using an encryption layer connection, the HTTP client 110A forms the encryption layer connection directly with the WAS 130A, and neither the encryption layer connection nor underlying transport layer connection are terminated in the security gateway 140.

The encryption protocol manipulation module 104, upon receiving the packets 108, is configured to decrypt any encrypted packet payloads carrying encryption layer connection records, buffer the payloads if necessary to construct single plaintext records, make any necessary modifications to the single plaintext records, construct encryption protocol headers and encrypt the modified single plaintext records, and cause the transport protocol modification module 102 to transmit either the packets carrying the encrypted modified records or the original packets carrying the original connection records to the web application server 130A. The encryption protocol manipulation module 104 also parses and analyzes plaintext handshake records used to generate the encryption layer connection, modifies the plaintext handshake records if necessary, and causes the transport protocol manipulation module 102 to transmit packets carrying the modified or original plaintext handshake records to the web application server 130A.

The transparent security gateway 140, in the embodiment of the invention depicted in FIG. 1, also includes an application protocol manipulation module 106 configured to receive plaintext connection records (comprising one or more application layer payloads) that were decrypted and constructed by the encryption protocol manipulation module 104, and to utilize one or more security modules 110 to determine if any of the plaintext connection records require modification. Each of the security modules 110 may be configured to identify different security or attack-related issues or vulnerabilities present in the application layer data of the plaintext connection records, and present to the encryption protocol manipulation module 104 modifications to be made to the plaintext connection records. In some embodiments, multiple sets of one or more security modules 110 each analyze a different type of application layer protocol traffic. For example, in an embodiment, a set of one more security modules 110 analyze HTTP traffic to identify security and/or attack-related issues. In some embodiments, each of the security modules 110 operates to identify a particular security issue or attack vulnerability in the traffic. For example, a security module 110 may identify a location within a plaintext connection record where data is to be inserted, a range of locations that need to be removed or replaced, and/or a range of data locations that should be temporarily held, at the security gateway 140, until additional packets arrive from the HTTP client 110A that allow for an ultimate modification decision to be made. The identified changes are passed back to the encryption protocol manipulation module 104, which performs the changes, constructs a modified encryption connection record, and causes the transport protocol manipulation module 102 to transmit the modified encryption connection record via a set of modified packets 108' in lieu of the original packets 108. In some embodiments, when the security modules 110 do not identify any modification to be made to a plaintext connection record, the application protocol manipulation module 106 may cause the original packets 108 to be sent, which were stored in a buffer, or reconstructed on-the-fly by the encryption protocol manipulation module 104 and/or transport protocol manipulation module 102. In certain embodiments, the security modules 110 to be utilized for all encryption layer connections or specific encryption layer connections are selected and/or enabled based upon a set of polices 318.

Although the embodiment depicted by FIG. 1 illustrates the security gateway 140 receiving, modifying, and transmitting packets sent over a single encryption layer connection on a single transport layer connection 104 in a single direction from an HTTP client 110A to a web application server 130A, in many embodiments the security gateway 140 is operative to receive, modify, and transmit packets sent over the encryption layer connection over the single transport layer connection in the direction from the web application server 130A to the HTTP client 110A. In some embodiments, the security gateway 140 is operable to perform these operations in both directions for a single encryption layer connection 104.

As described earlier herein, security gateways are sometimes deployed as transparent inline security gateways. However, security gateways are also sometimes deployed as reverse proxies. Although security gateways configured as reverse proxies servers are able to modify data transmitted over an encryption layer connection, such reverse proxy configurations suffer from numerous flaws. First, reverse proxies are necessarily assigned an IP address that clients will use to access the content and/or services of the protected server(s). Thus, adding a reverse proxy to an existing network requires transferring the IP address of the server(s) to the reverse proxy, and assigning a different address, of possibly a different subnet, to the server(s). In some cases, this may require physical changes in the network wiring. In contrast, a transparent inline security gateway (e.g., bridge device) is transparent and acts like a wire, and thus can be inserted seamlessly between any two network devices (e.g., switches, routers) and/or end stations (e.g., server end stations) in a network.

Additionally, when protecting servers that provide content and/or services to users outside of a LAN, a reverse proxy, which is not transparent and has an IP address of its own, must be accessible from the outside network and thus becomes a target to attacks. Moreover, if the reverse proxy becomes compromised, it will provide attackers with potentially unfettered access to the internal network. In contrast, a transparent security gateway is not assigned an IP address of its own and thus cannot be attacked directly. Similarly, if a transparent security gateway is compromised, connections cannot be easily made from it to other hosts in the internal network.

Further, reverse proxy implementations suffer from additional performance overhead as compared to transparent implementations. Reverse proxy implementations necessarily terminate the transport layer connections from clients and open new connections to the server (or use a pool of connections), which may require working with sockets over a full blown TCP/IP stack. Transparent security gateways, on the other hand, inspect packets as they go by and thus do not need to open, maintain, and/or close network connections, which requires less processing effort and maintained system state.

Reverse proxy configurations also present a significant downside when the reverse proxy becomes unavailable. In the case of a failure of the reverse proxy, the content and/or services of the protected servers become unavailable to the clients, as the client is not aware of the existence of the protected servers (as being separate from the reverse proxy) and thus typically is not able to form direct connections to the protected servers. In transparent security gateway implementations, however, packets can continue to pass through to the protected servers during failure scenarios using a hardware bypass.

Reverse proxy implementations also terminate encryption layer connections, i.e., the handshake is performed between the client (a web browser acting as an HTTP client, for example) and the reverse proxy, which "stands in" for the server. The reverse proxy then opens another transport layer connection to the real server, and possibly—to keep the traffic encrypted over the entire network path to the server—opens another encryption layer connection by performing another handshake between the reverse proxy and the real server. In contrast, transparent implementations do not terminate encryption layer connections, and thus do not have to perform and manage extra encryption protocol handshakes. Furthermore, a reverse proxy implementation, after receiving and decrypting data from a client or server, must then re-encrypt the data before sending it because each encryption layer connection (of the two) uses different encryption keys that are derived from the two different handshakes. A transparent security gateway implementation does not have two separate keys for one client-to-server connection, and therefore does not need to re-encrypt received data when the data is not changed.

Multi-Mode Operation

Additionally, reverse proxy-based implementations require this additional overhead for all connections, all of the time. Embodiments of the described invention that support multi-mode operation, however, allow selective modification in only some of the connections from clients to servers, and may further allow modifications in only some (but not all) connections for only a portion of the traffic (for example, traffic flowing in one direction, or starting modification in the middle of the connection). Thus, the overall expected performance degradation when modification occurs is comparatively much lower, and the scalability of such a system is much more favorable.

Figure 2:
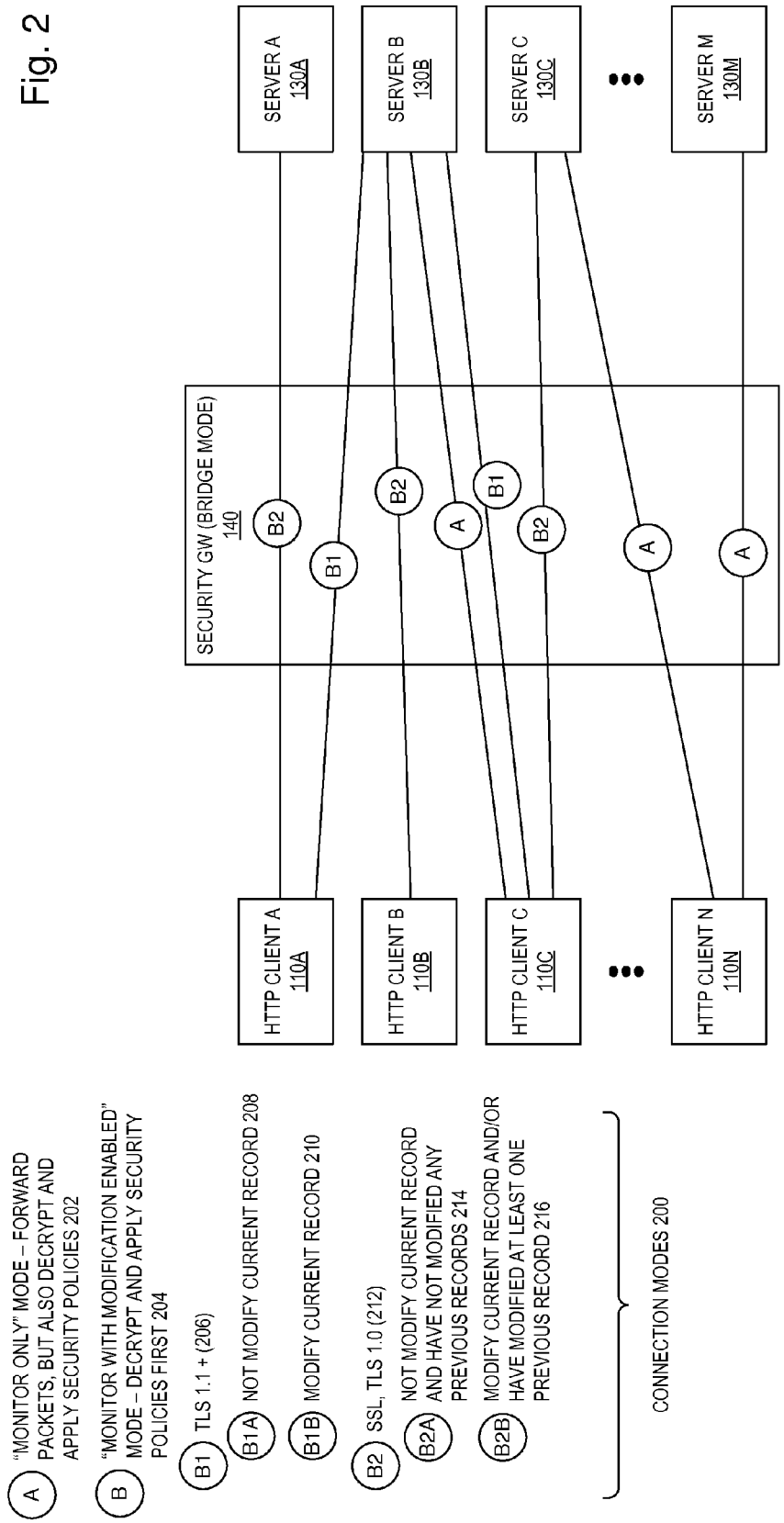
FIG. 2 is a block diagram illustrating a transparent security gateway operable to manage encryption layer connections in different connection modes according to certain embodiments of the invention.

FIG. 2 is a block diagram illustrating a transparent security gateway 140 operable to manage encryption layer connections in different connection modes according to certain embodiments of the invention. In embodiments of the invention, the security gateway 140 is operable to transparently process multiple encryption layer connections from multiple HTTP clients 110A-110N using different connection modes 200.

One connection mode 200, deemed "monitor only" mode 202 and represented by a circle 'A', processes encryption layer connections by immediately forwarding received packets on to the requested destination server (e.g., 130B), while also utilizing the encryption protocol manipulation module 104 to decrypt the data records and the application protocol manipulation module 106 to analyze the plaintext data records by utilizing security modules 110 per a set of security policies 318. By immediately forwarding on the received packets to the destination, the "monitor only" mode provides a benefit in that it does not require the security gateway 140 to maintain buffers to cache packets while the packets are being decrypted and analyzed, and further does not slow down the flow of packets from reaching the intended destination.

While in monitor only mode 202, upon a security module 110 determining that a modification is to be made or a modification may likely be made in the future, the security gateway 140 may be configured to switch to another connection mode 200 deemed "monitor with modification enabled" mode 204. However, at the point of determining that a modification is necessary or will likely be necessary, the set of one or more packets being analyzed that led to the determination have already been forwarded on, and thus, the security gateway 140 can begin modification starting with the next received connection record being transmitted over the encryption layer connection.

In "monitor with modification enabled" mode 204, which is represented as circle 'B', the security gateway 140 does not immediately forward on received packets while performing decryption and analysis. While in some embodiments the received packets are cached during the analysis, and only sent on when the analysis determines no modifications are required; in other embodiments the received packets are discarded and then reconstructed, whether modifications are required or not, and sent toward the ultimate destination.

In an embodiment of the invention, monitor with modification enabled mode 204 includes different sub-modes depending upon the particular encryption protocol utilized. For example, in the embodiment depicted by FIG. 2, two sub-modes are utilized: one for TLS version 1.1 and higher 206, and one for all versions of SSL and TLS version 1.0 212. Similarly, each of the two sub-modes (206, 212) has two sub-modes. First, sub-mode TLS v1.1+206 includes a sub-mode where a current encryption record is not being modified 208, and a sub-mode where a current encryption record is being modified 210. Sub-mode SSL and TLS v1.0 212 includes a sub-mode where a current encryption record is not being modified and no previous encryption record of the encryption layer connection has been modified 214, and a sub-mode where a current encryption record is being modified or at least one previous encryption record has been modified 216.

As depicted in FIG. 2, the security gateway 140 may simultaneously process a plurality of encrypted connections in different connection modes 200, which may be from one client or multiple HTTP clients 110A-110N, and directed to one or multiple servers 130A-130M. For example, HTTP client 'A' 110A has an active SSL or TLS 1.0 212 connection to server 'A' 130A in "monitor with modification enabled" mode 204 as well as an active TLS 1.1+ 206 connection to server 'B' 130B also in "monitor with modification enabled" mode 204. Thus, the security gateway 140 is processing two different encryption layer connections involving one HTTP client 110A in two different connection modes 200. This scenario can arise if one of the servers (e.g., server 'A' 130A) only supports an old encryption protocol such as SSL or TLS 1.0 212 and one of the servers (e.g., server B' 130B) supports a newer encryption protocol such as TLS 1.1 206, as some servers may attempt to create an encryption layer connection with an HTTP client using different encryption protocols according to a priority scheme and what protocols the HTTP client can utilize. For example, in a "Client Hello" message sent by an HTTP client at the beginning of an encryption layer connection handshake, the HTTP client will indicate the types and versions of encryption protocols it can utilize; then, in a "Server Hello" message sent by the server responsive to the "Client Hello" message, the server will typically indicate an encryption protocol to be used for the encryption layer connection by selecting the highest version number of an encryption protocol that the server supports that exists in the "Client Hello" message. Further details regarding encryption protocol handshakes and the ability of the security gateway 140 to modify handshake messages is presented later herein with respect to FIGS. 3, 4, 5, and 6.

Similarly, FIG. 2 depicts an SSL or TLS v1.0 212 encryption layer connection of an HTTP client 'B' 110B being processed by the security gateway 140. Thus, two different encryption layer connections involving one server 130B are processed by the security gateway 140 in different connection modes 200—one for TLS 1.1+ 206, and one for SSL or TLS 1.0 212. FIG. 2 also depicts the security gateway 140 processing three encryption layer connections from an HTTP client 'C' 110C in three different modes, and two encryption layer connections from an HTTP client 'N' 110N in a "monitor only" mode 202.

By processing encryption layer connections in multiple connection modes 200, and further by changing connection modes 200 for an encryption layer connection during the course of the connection, the security gateway 140 is able to support a large number of HTTP clients because it can reduce processor (e.g., encryption, modification) and/or memory resources (e.g., packet caching) by performing "lightweight" processing when possible.

While embodiments are described that support the "monitor only" mode, alternative embodiments of the invention may not (e.g., may only support the "monitor with modification enabled" mode).

Selective Modification of Handshake Records for Establishing Encryption Connections ("Monitor with Modification Enabled Mode")

Figure 3:
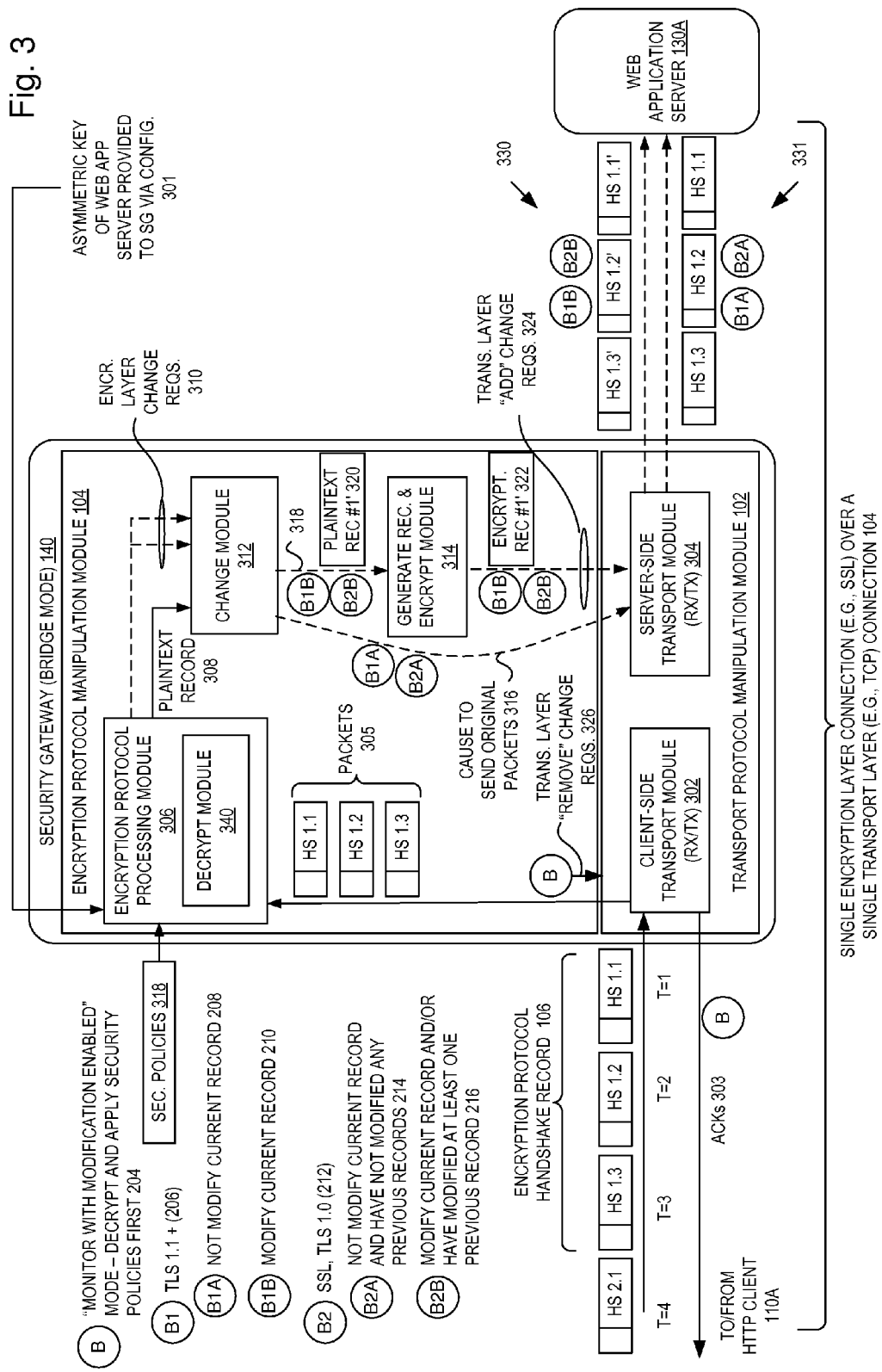
FIG. 3 is a block diagram illustrating a transparent security gateway operable to selectively modify encryption protocol handshake messages according to certain embodiments of the invention.

FIG. 3 is a block diagram illustrating a transparent security gateway operable to selectively modify encryption protocol handshake messages according to certain embodiments of the invention. FIG. 3 illustrates the processing, and selective modification, of encryption handshake messages by the security gateway 140. In this depicted embodiment, the security gateway 140 utilizes a processing optimization that reduces the need for processing resources at the expense of utilizing additional memory resources.

As the client-side transport reception and transmission (RX/TX) module 302 of the security gateway 140 receives packets carrying an encryption protocol handshake record 106 and passes the packets 305 to the encryption protocol manipulation module 104, the encryption protocol manipulation module 104 will determine that the packets are part of a connection being processed in a "monitor with modification enabled" mode 204, meaning the packets should not be immediately forwarded through the security gateway 140 to the intended web application server 130A. Thus, in an embodiment, the packets may be placed in a buffer (not illustrated) during processing. To prevent the packets from being immediately forwarded, the encryption protocol manipulation module 104 issues a transport layer "remove" change request 326 to the transport protocol manipulation module 102. Upon receipt of a transport layer "remove" change request 326, the transport protocol manipulation module 102 may, in various embodiments, remove or stop those packets from being placed in an output buffer containing packets to be imminently forwarded to their respective destinations.

In some embodiments, the security gateway 140, further in response to receipt of a transport layer "remove" change request 326, will also send one or more acknowledgements 303 (e.g., an ACK packet used in TCP) to acknowledge receipt of the packets, allowing the HTTP client 110A to continue sending additional packets. This occurs because during the processing of packets, it may be necessary for the security gateway 140 to examine additional packets of the connection to make a determination about a potential need for modification. However, per transport layer protocols (e.g., TCP), the transmitting entity (e.g., HTTP client 110A) may not continue sending new packets unless periodic acknowledgement (ACK) packets are received. Thus, in an embodiment, while the security gateway 140 is processing the packets, the original packets have not been forwarded to the web application server 130A, so the web application server 130A cannot send such acknowledgements to the HTTP client 110A. To handle this issue, the transport protocol manipulation module 102, despite not being an endpoint of the transport layer connection, may be configured to, at certain intervals and/or in response to receipt of a transport layer "remove" change request 326, send ACK messages 303 to the HTTP client 110A on behalf of the web application server 130A, which prevents the HTTP client 110A from continually re-transmitting the same packets. Ultimately, when the original or modified packets are eventually sent to the web application server 130A, and the web application server 130A sends ACK messages in response, the security gateway 140 may be configured to drop these ACK messages, as it has already acknowledged those packets. In this manner, the HTTP client 110A continues transmitting packets and receiving acknowledgements and the web application server 130A continues receiving packets and sending acknowledgements, so the security gateway 140 remains transparent. In an embodiment, the security gateway 140 will transmit an ACK message for every other packet received for a particular connection. In some embodiments where the payload size of the packets may be less than a Maximum Segment Size (MSS) of the TCP connection, the security gateway 140 may transmit an ACK message after receipt of one or more packets having payload sizes that collectively meet or exceed the MSS.

Upon receipt of the handshake packets 305, in an embodiment the encryption protocol processing module 306 constructs the plaintext record 308 carried by the one or more handshake packets 305. Because handshake packets are utilized as part of a handshake protocol to generate a symmetric key to be used for an encryption layer connection, most handshake packets are not encrypted. For such non-encrypted handshake packets, the encryption protocol processing module 306 will buffer the received packets until each complete plaintext handshake record is assembled, and parse/analyze the handshake record based upon provided security policies 318 to determine if any modifications to the handshake record are necessary. For example, the encryption protocol processing module 306 may look for the existence of certain cipher names in a cipher suite portion of a "Client Hello" handshake message that are deemed to be "weak" or poor ciphers (e.g., "RC4-MD5"), and may wish to remove one or more such ciphers from that message. If the encryption protocol processing module 306 does determine modifications are necessary, the encryption protocol processing module 306 sends the plaintext handshake record 308, along with one or more encryption layer change requests 310 that identify the modification(s) necessary to the complete plaintext handshake record 308 to a change module 312, which performs the modification. Following the weak cipher example, the encryption layer change request may indicate the cipher names to be removed (e.g., by sending a string location and number of characters to be removed, etc.).

However, after a symmetric key is generated for the encryption layer connection, many encryption protocols require the handshake to terminate only after each party transmits an encrypted message using the symmetric key. The encryption protocol manipulation module 104 is able, in embodiments of the invention, to follow along with the unencrypted handshake messages and utilize the asymmetric (private) key 301 of the web application server 130A to similarly generate the symmetric key to be used for the encryption layer connection. For example, the encryption protocol processing module 306 can watch the encryption protocol handshake records (e.g., 106) from each direction (i.e., from the HTTP client 110A to the WAS 130A, and from the WAS 130A to the HTTP client 110A) to determine the version of SSL or TLS to be used (e.g., by parsing a "Server Hello" message sent by the WAS 130A), the SSL cipher suite to be used as the algorithm for the key exchange, random data used to generate a master secret, etc., which allows it to silently participate in the encryption protocol handshake and capture the symmetric key by performing the same calculations as the WAS 130A.

Having generated the symmetric key, the decrypt module 340 is able to use this symmetric key to decrypt the encrypted handshake messages to generate plaintext records 308 for processing using the encryption protocol processing module 306, as described above. In embodiments of the invention, the decrypt module 340 also verifies that the encrypted messages are valid by verifying a message authentication code (MAC) or keyed Hashed MAC (HMAC) of the message.

As one example, after generating a symmetric key during the plaintext portion of the handshake, both the client and the server will encrypt and transmit a "finished" handshake message including a value that is the result of a hash function being applied to all the handshake messages sent and received by that particular client or server. If each side can successfully decrypt the finished message sent by the other side of the connection using the new symmetric key, and further determine that the hash value matches a local copy of that hash value, each party to the connection is further assured of the success of the handshake and encrypted connection. However, if the hash value is not a match, the connection is aborted. In embodiments where one or more of the plaintext records of a handshake are modified, however, the hashed value from each side will not match because a transmitted message sent by one side may be modified and thus will not be the same when it arrives at the other side of the connection. Accordingly, in an embodiment, the encryption protocol processing module 306 is configured to cache, for each side of the connection, a copy of each message received and transmitted (i.e., including modified messages) by the security gateway 140 during the handshake. Then, when one side of the connection (e.g., the HTTP client 110A) transmits an encrypted finished message to the other side (e.g., the WAS 130A), the encryption protocol manipulation module 104 can determine if any messages of the handshake have been modified. If so, the encryption protocol manipulation module 104, using the decrypt module 340, can utilize the same hash function with a cached copy of all handshake messages received from the WAS 130A and transmitted (by the security gateway 140) to the WAS 130A to generate a hash value that will be the same as the hash value ultimately computed by the WAS 130A. Similarly, upon receipt of an encrypted finished message from the WAS 130A, the encryption protocol manipulation module 104 can determine that a previous modification has been made, apply the hash function to a set of all handshake messages sent to and received from the HTTP client 110A, and create a new encrypted finished message to be sent to the HTTP client 110A that will match the hash value computed by the HTTP client 110A. In an embodiment, the newly computed hash value is part of an encryption layer change request 310 sent along with the plaintext 308 finished message to the change module 312. Thus, the handshake protocol is able to successfully complete, despite the security gateway 140 having transparently modified one or more handshake messages of the handshake. In another embodiment, each of the handshake messages need not be cached by the security gateway 140; instead, upon receipt of each handshake message, the security gateway 140 can incrementally update cached hash values based upon hashing the received handshake message as well as the modified or unmodified handshake message that has been transmitted on toward its destination.

Thus, the encryption protocol manipulation module 104 generates a complete plaintext record 308 (optionally using the decrypt module 340, for those encrypted handshake messages) and analyzes the plaintext record to optionally generate one or more encryption layer change requests 310. The change module 312, upon receiving the plaintext record 308, will determine if there are any encryption layer change requests 310 to be applied to the plaintext record 308. If not, and if the plaintext record 308 belongs to an encryption layer connection in connection modes of circles 'B1A' 208 or 'B2A' 210, the change module will cause 316 the server-side receive and transmit (RX/TX) transport module 304 to send the original, cached packets 331 carrying the encryption handshake record 106. If there are encryption layer change requests 310 to be applied to the plaintext record 308, the change module 312 will apply those changes to create a modified plaintext record 320, and flow will continue 318 in the connection modes of circles 'B1B' 210 or 'B2B' 216 to the generate record and encrypt module 314. This module will take the modified plaintext record 320, build any necessary encryption header, split the plaintext record 320 into multiple encryption records if necessary (due to size constraints that may exist in the protocol), and encrypt the modified plaintext record 320 to create an encrypted modified encryption handshake record 322. Flow continues with the generate record and encrypt module 314 issuing one or more transport layer "add" change requests 324 to the transport protocol manipulation module 102 to instruct the transport protocol manipulation module 102 to transmit packets to carry the modified encryption handshake record 322 to the destination WAS 130A. The underlying transport protocol manipulation module 102, upon receipt of the transport layer "add" change requests 324 and the modified encryption handshake record 322, will split the encrypted modified encryption handshake record 322 into one or more payloads for packets (depending upon any size constraints of the transport layer payloads) and transmit (and possibly handle retransmissions, if necessary) those packets 330 to the destination WAS 130A.

Figure 4:
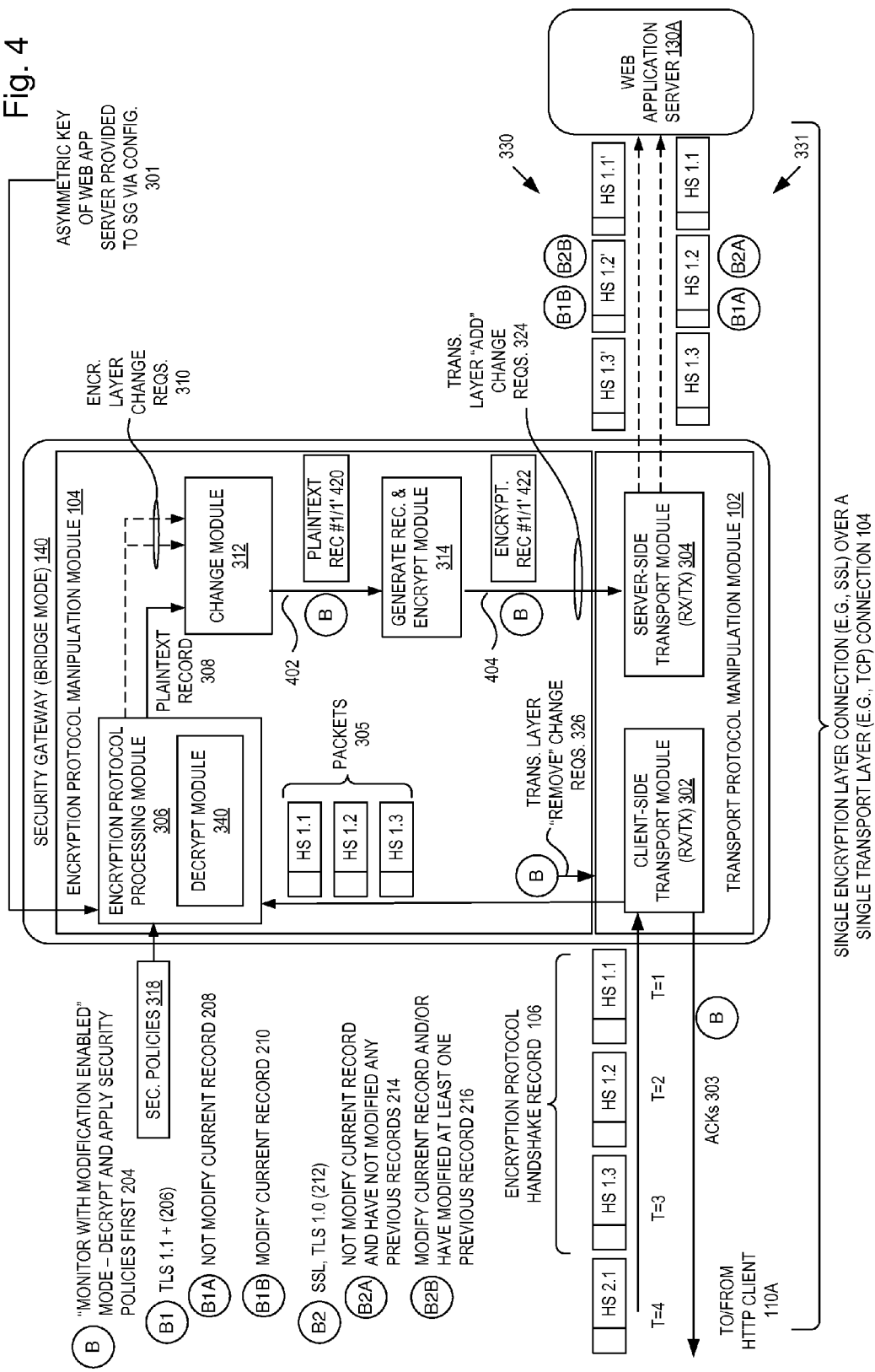
FIG. 4 is a block diagram illustrating a transparent security gateway operable to selectively modify encryption protocol handshake messages using a memory optimization technique according to certain embodiments of the invention.

FIG. 4 is a block diagram illustrating a transparent security gateway operable to selectively modify encryption protocol handshake messages using a memory optimization technique according to certain embodiments of the invention. Although FIG. 4 is similar to the embodiment of FIG. 3, in contrast the security gateway 140 of FIG. 4 employs a memory optimization technique that reduces the need for memory resources at the expense of utilizing additional processing (e.g., encryption) resources—original received packets 305 are not cached during processing. In the embodiment depicted in FIG. 4, processing begins in a similar manner; packets carrying an encryption protocol handshake record 106 are received from an HTTP client 110A by a client-side RX/TX module 302, and the packets 305 are passed to an encryption protocol processing module 306. At this point, the encryption protocol manipulation module 104 notes that this connection operates in "monitor with modification enabled" mode 204 and issues a set of one or more transport layer "remove" change requests 326, causing the client-side RX/TX module 302 to send one or more ACKs 303 to the HTTP client 110A. The encryption protocol processing module 306, using a set of policies 318 and optionally using a decrypt module 340 for encrypted handshake records, will generate a plaintext record 308 and optionally generate encryption layer change requests 310, which will be applied by the change module 312. The modified or unmodified plaintext record 420, is sent 402 to the generate record and encrypt module 314, which will generate an encrypted handshake record 422 regardless of whether the plaintext record was modified or not. This encrypted (modified or unmodified) handshake record 422 is sent 404 by way of transport layer "add" change requests 324, which causes the server-side transport RX/TX module 304 to generate and transmit one or more modified 330 or unmodified 331 packets to the WAS 130A.

Figure 5:
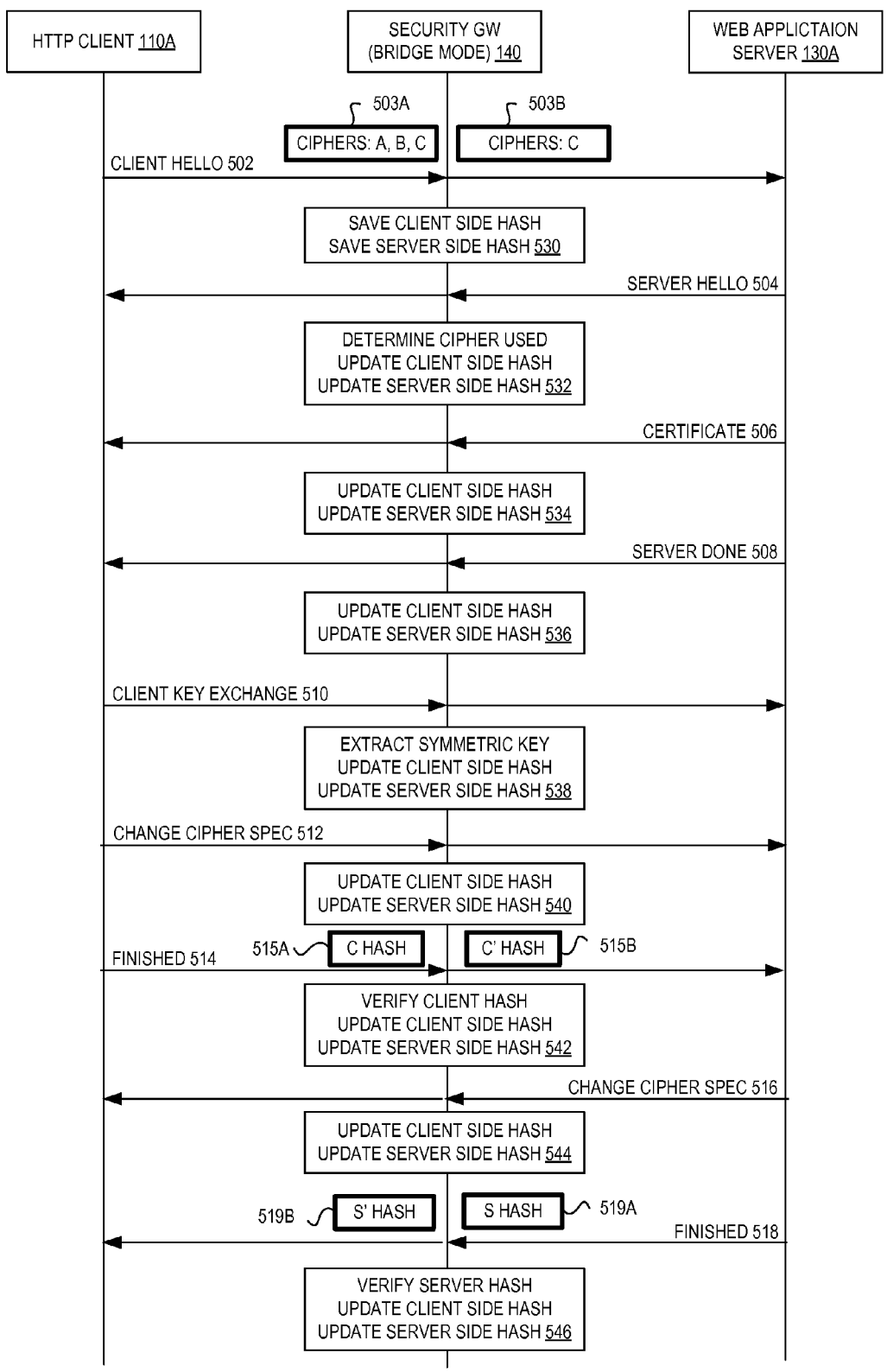
FIG. 5 is a sequence diagram illustrating a transparent security gateway between an HTTP client and a web application server and operable to modify encryption protocol handshake messages and capture a generated symmetric key according to certain embodiments of the invention.

FIG. 5 is a sequence diagram illustrating a transparent security gateway 140 between an HTTP client 110A and a web application server 130A and operable to modify encryption protocol handshake messages and capture a generated symmetric key according to certain embodiments of the invention. FIG. 5 illustrates a variety of handshake messages that might be sent during particular encryption protocol handshakes; of course, not all of these handshake messages need to be sent in all embodiments of the invention, and in some embodiments other handshake messages are sent.

At 502, a "client hello" handshake message is sent from the HTTP client 110A including a list of ciphers 503A (e.g., cipher 'A', 'B', 'C'). The security gateway 140, upon receipt of the message, may decide to remove ciphers 'A' and 'B' to create a modified "client hello" message 503B, which is sent to the WAS 130A. At 530, the security gateway 140 saves a copy of the "client hello" message 502 received from the HTTP client 110A in a first client-side hash storage location (storing messages as received from the HTTP client 110A), and saves a copy of the modified "client hello" message sent to the WAS 130A in a second client-side hash storage location (storing unmodified and/or modified messages actually sent to the WAS 130A). In some embodiments, during the handshake one or more of the handshake messages—which are identified by the specification for the particular encryption protocol being used—are concatenated together in the respective hash storage locations and ultimately hashed using a hash function to yield a value to be used in a "finished" handshake message. Accordingly, in some embodiments, a first and second hash storage location is maintained for both the HTTP client 110A and the WAS 130A (i.e., four hash storage locations are maintained), and thus copies of the handshake messages as received and ultimately transmitted by the security gateway 140—in both directions—are maintained. By maintaining hash storage locations for every handshake message received and transmitted, in both directions, the security gateway 140 is enabled to verify hash values within the "finished" handshake messages transmitted by the HTTP client 110A and the WAS 130A. For example, a finished handshake message generated by the HTTP client 110A will be based upon unmodified messages transmitted by the HTTP client 110A (and stored by the security gateway 140 in a first hash storage location) as well as messages (modified or unmodified) received by the HTTP client 110A (and stored by the security gateway 140 in a second hash storage location). Similarly, a finished handshake message generated by the WAS 130A will be based upon unmodified messages transmitted by the WAS 130A (and stored by the security gateway 140 in a third hash storage location) and messages (modified or unmodified) received by the WAS 130A (and stored by the security gateway 140 in a fourth hash storage location). By maintaining the four hash storage locations, the security gateway 140 is thus able to verify the received finished handshake messages as well as construct modified finished handshake messages (if necessary) to be sent to the HTTP client 110A and the WAS 130A to enable the handshake to succeed. Thus, the security gateway 140 is enabled to verify the integrity of the handshake and thus the integrity of the formed encryption connection by determining that no other device has modified any value in the handshake messages. Further detail regarding handshake verification is presented below with respect to blocks 542 and 546.

However, in other embodiments, only two hash storage locations are maintained—one including messages sent by the HTTP client 110A and ultimately forwarded (and possibly modified) to the HTTP client 110A, and another including messages sent by the WAS 130A and ultimately forwarded to (and possibly modified) the WAS 130A. One benefit of only utilizing two hash storage locations (as compared to maintaining four hash storage locations) is that memory/storage requirements are reduced; however, in these embodiments the security gateway 140 is unable to verify the integrity of the handshake and may even operate to conceal a handshake modification made by a different device from each of the end points of the connection. Accordingly, such embodiments using only two hash storage locations are best suited for environments where memory is in short supply and/or where either the risk of handshake tampering is very low or the harm caused by a handshake being modified is negligible.

In an alternate embodiment using incremental hashing, at 530 the security gateway 140 hashes the "client hello" message 502 received from the HTTP client 110A to update a first client-side hash storage location (storing a "running" hash of messages received from the HTTP client 110A), and hashes the modified "client hello" message sent to the WAS 130A to update a second client-side hash storage location (storing hashes of the unmodified and/or modified messages actually sent to the WAS 130A).

At 504, a "server hello" message is sent by the WAS 130A, and the security gateway 140 will identify 532 the encryption cipher to be used according to this message, and update both the server-side and client-side hash storage locations based upon the respective received and transmitted "server hello" 504 messages.

At 506, the WAS 130A transmits a certificate message, and the client-side and server-side hash storage locations 534 are updated by the security gateway 140. At 508, the WAS 130A transmits a "server done" message, and similarly the client-side and server-side hash storage locations 536 are updated by the security gateway 140 based upon this message.

At 510, the HTTP client 110A transmits a "client key exchange" message, which allows the security gateway 140, using the private key 301 of the WAS 130A, to determine 538 the symmetric key that will be utilized for the encryption layer connection and also update the client-side and server-side hash storage locations 538 based on this message.

At 512, the HTTP client 110A sends a "change cipher spec" message to signal a transition in ciphering strategy (i.e., that it will now transmit encrypted messages), and the client-side and server-side hash storage locations 540 are updated by the security gateway 140 based upon this message.

Some encryption handshake protocols require a message digest to be computed of all the messages exchanged in order to verify that the server and the client have received the same messages, and no errors or attacks have been introduced during the transmission of the handshake messages. To perform this verification, the client may first compute a message digest of all the messages that client has sent and received during the handshake, and then transmit the result to the server via a "finish" or "finished" message. The server may then compute the message digest of all handshake messages the server has sent and received in order to verify that the two message digests are the same. The client and server may compute the message digest using an algorithm that has been agreed upon during the course of the handshake. Some examples of message digest algorithms include (but are not limited to) MD2, MD4, MD5, or Secure Hash Algorithm (SHA-0, SHA-1, SHA-2, SHA-3). Accordingly, at 514, the HTTP client 110A sends an encrypted "finished" message that includes a hash value 515A based upon all handshake messages transmitted and received by the HTTP client 110A.

In an embodiment, at 542, the security gateway 140 will verify 542 that the client hash value 515A matches a hash value computed by the security gateway 140 using the stored handshake messages (or, depending upon the embodiment, using the stored incrementally-updated hash value(s) of the handshake messages) it sent to and received from the HTTP client 110A. If the values do not match, the security gateway 140 may cause the handshake and encrypted connection to be aborted by, in various embodiments, transmitting reset packets or by computing a purposefully incorrect hash value (515B) to be sent to the WAS 130A, causing it to reject the establishment of the connection.

Assuming the client hash value 515A is verified to be correct, due to the "client hello" message 502 being previously modified, the security gateway 140 must replace this client hash value 515A with a computed new client-side hash value 515B based upon the handshake messages received from the WAS 130A and the messages transmitted to the WAS 130A (or, using the stored incrementally-updated hash value(s) of the handshake messages). Accordingly, the hash computed by the WAS 130A (based upon the handshake messages it received and sent) will match the computed new client-side hash value 515B, and the handshake will continue. Using these messages, at 542, the security gateway 140 will perform one or more of updating the client-side hash storage location and updating the server-side hash storage location.

At 516, the WAS 130A transmits a "change cipher spec" message 516 to signal a transition in its ciphering strategy (i.e., that it will now transmit encrypted messages), and the client-side and server-side hash storage locations 544 are again updated by the security gateway 140 based upon this message. At 518, the WAS 130A transmits its own encrypted "finished" message that includes a server hash value 519A based upon all handshake messages transmitted and received by the WAS 130A. At 546, the security gateway 140 may verify this server hash value 519A matches a hash value computed by the security gateway 140 using the stored handshake messages it sent to and received from the WAS 130A. If the values do not match, the security gateway 140 may cause the handshake and encrypted connection to be aborted, as described above.

Because previous handshake messages have been modified by the security gateway 140, if this server hash value 519A would be received by the HTTP client 110A, the HTTP client 110A would reject the handshake and encryption layer connection because the server hash value 519A would not match its own computed value for the server hash value. Accordingly, the security gateway 140 must replace this server hash value 519A with a computed new server-side hash value 519B based upon the handshake messages received from the HTTP client 110A and the messages transmitted to the HTTP client 110A. Accordingly, the hash computed by the HTTP client 110A (based upon the handshake messages it received and sent) will match the computed new server-side hash value 519B, and the handshake will continue. Using these messages, at 546, the security gateway 140 may perform one or more of updating the client-side hash storage location and updating the server-side hash storage location. At this point, the handshake is complete, and the HTTP client 110A and/or the WAS 130A will being transmitting encrypted data records using the generated symmetric key.

In some embodiments of the invention, an abbreviated encryption protocol handshake may be used to resume a previously established encryption layer connection. In another embodiment, a handshake may also include server verification of a client, such as via transmission from the client to the server of a client certificate and a client certificate verify message.

Handshake Records in "Monitor Only" Connection Mode

Figure 6:
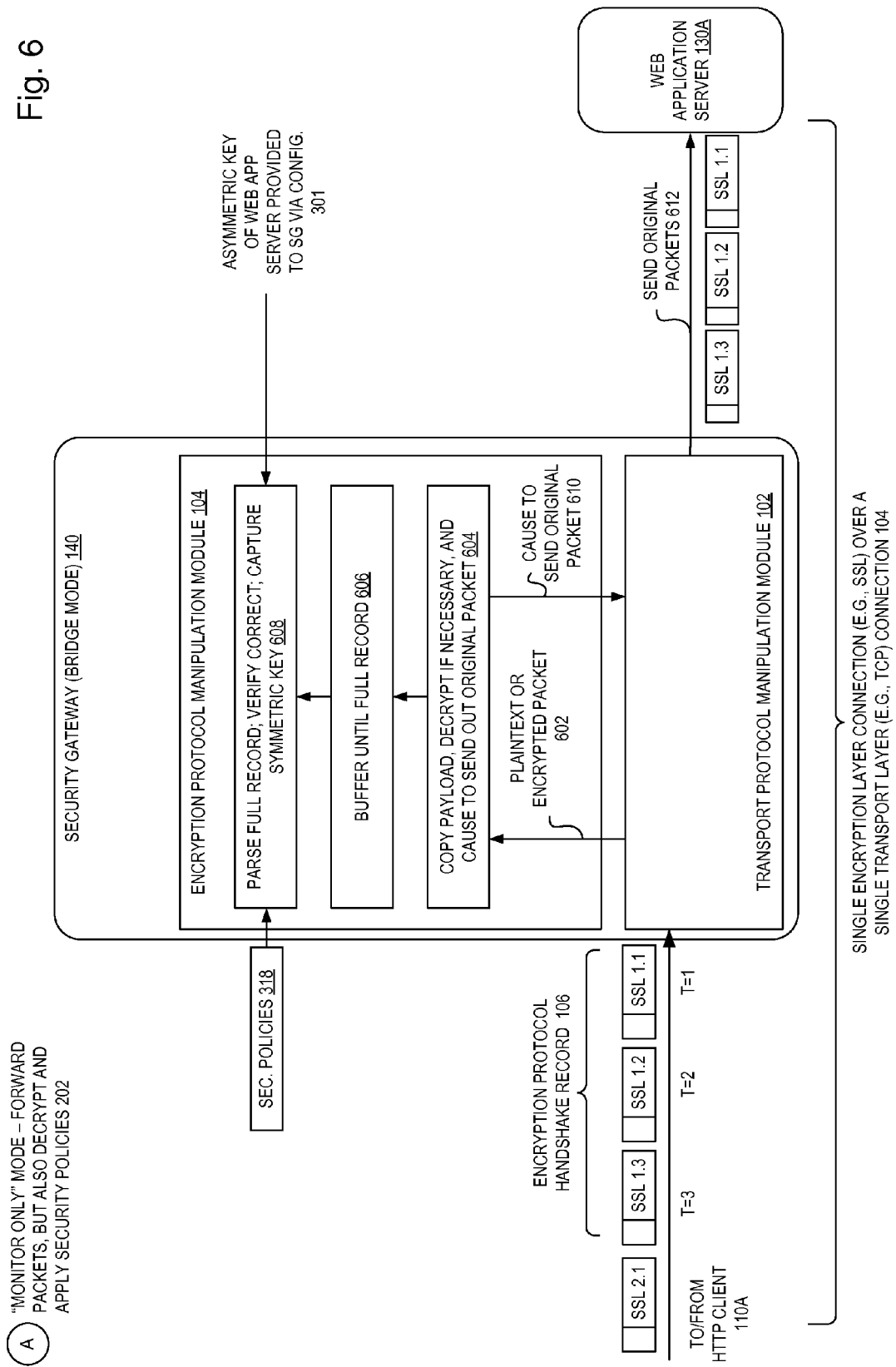
FIG. 6 is a block diagram illustrating a transparent security gateway operable to monitor encryption protocol handshake messages in a "monitor only" mode according to certain embodiments of the invention.

FIG. 6 is a block diagram illustrating a transparent security gateway operable to monitor encryption protocol handshake messages in a "monitor only" mode according to certain embodiments of the invention. In this depiction, the actual sub-modules within the security gateway 140 are not illustrated to avoid obfuscating the operation of the system; however, the security gateway 140, in various embodiments, may provide the same functionality using the same modules as exist in FIGS. 3 and 4.

In the depicted embodiment, the encryption protocol handshake record 106 is received as a set of one or more plaintext or encrypted packets by a transport protocol manipulation module 102 and sent 602 to the encryption protocol manipulation module 104. At 604, the encryption protocol manipulation module 104 copies the payload of each packet if necessary (in some embodiments, the payload of the received packet may be operated upon in-place), decrypts the payload if necessary, and causes 610 the transport protocol manipulation module 102 to transmit 612 each original packet. In an embodiment, the encryption protocol manipulation module 104 causes the transport protocol manipulation module 102 to transmit the packets by analyzing each packet, determining that the packet belongs to an encryption layer connection that it is configured to process in "monitor only" mode 202, and issuing a set of commands/signals to the transport protocol manipulation module 102 to send the original packets 612. The encryption protocol manipulation module 104 buffers 606 the plaintext packets until a full record exists, and then parses 608 and analyzes the full record based upon a set of policies 318 to identify possible security concerns, verifies that the message is correct, and may use these handshake messages to "follow along" with the handshake as if it were the WAS 130A (by using the asymmetric key of the WAS provided via configuration 301) to capture the generated symmetric key. If the encryption protocol manipulation module 104, during the parsing and analysis 608 of the full record, determines that changes to the handshake or eventually established encryption layer connection will or may be required, the encryption protocol manipulation module 104 may update a state table to indicate that packets of that particular encryption layer connection are to be processed using a different connection mode (i.e., not use "monitor only" mode 602). Since the currently-analyzed original packets have already been sent 612, actual modification may occur with the next set of packets (e.g., a next full record) for that connection.

Encrypted Data Records in "Monitor with Modification Enabled" Connection Mode

Figure 7:
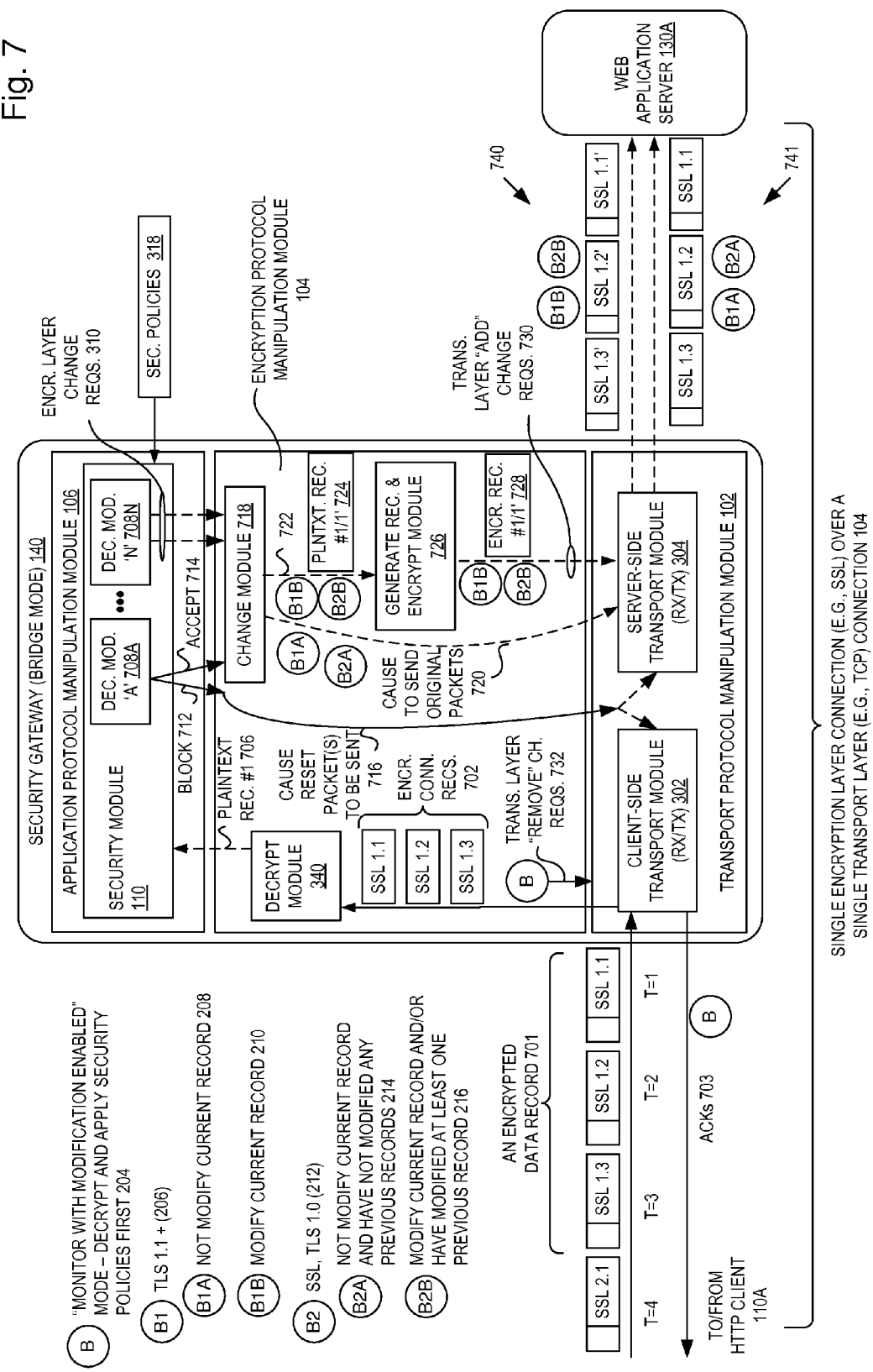
FIG. 7 is a block diagram illustrating a transparent security gateway operable to selectively modify encrypted data records transported over an encryption layer connection in a "monitor with modification enabled" mode according to certain embodiments of the invention.

In addition to processing handshake records, embodiments of the invention also allow for modification of encrypted data records. FIG. 7 is a block diagram illustrating a transparent security gateway 140 operable to selectively modify encrypted data records of an encryption layer connection in a "monitor with modification enabled" mode 204 according to certain embodiments of the invention. In this embodiment, the security gateway 140 utilizes a processing optimization that reduces the need for processing resources at the expense of utilizing additional memory resources.

In the embodiment of FIG. 7, a set of packets comprising an encrypted data record 701 of an encryption layer connection are received by a client-side transport RX/TX module 302, buffered (not illustrated) while the packets are processed. The client-side transport RX/TX module 302 removes lower level protocol headers (e.g., transport layer headers and lower level headers, etc.) and sends the encrypted payloads (i.e., encrypted "connection records" of an encryption layer connection) 702 to a decrypt module 340, which decrypts the encrypted payloads to acquire plaintext payloads, buffers the plaintext payloads until a full plaintext record is available, verifies a MAC/HMAC of the message, and passes the plaintext record 706 to a security module 110 of an application protocol manipulation module 106. The security module 110 utilizes a set of security policies 318 together with one or more decision modules 708A-708N to analyze the plaintext record 706. In an embodiment, each of the decision modules 708A-708N analyzes the plaintext record 706 to determine if there is a particular security vulnerability or opportunity to modify the record to increase security.

Many such vulnerabilities or opportunities exist and may be customized. In an embodiment, one or more decision modules 708A-708N may look for HTTP messages including certain HTTP headers to be modified or removed. For example, HTTP headers from WAS responses that identify the server type or the type of services provided, such as the standard "Server" header (e.g., "Server: Apache") or the non-standard "X-Powered-By" header (that identifies a type and version of software used by the WAS, e.g., "X-Powered-By: PHP/5.1.2-1+b1"), may be removed if found.

As another example, one or more decision modules 708A-708N may look for WAS HTTP response messages including a server set cookie, and add a custom cookie to the WAS HTTP response cookie. In an embodiment, the custom cookie value includes a signature of the server's cookie value, and a validation module (not pictured) of the security gateway 140 may then inspect further HTTP requests by looking for the additional custom signature cookie to validate that the original cookie value was not changed. In an embodiment, if the original cookie value was changed, the validation module may cause the security gateway 140 to drop the encryption layer connection (e.g., cause reset packets to be sent 716 to each of the ends of the connection).

For another example, one or more decision modules 708A-708N may look for specific HTML, response pages from the WAS and inject custom JavaScript. In an embodiment, the custom JavaScript may cause the HTTP client (e.g. 110A) to be tested for malware without making any changes to the web application of the WAS 130A. In another embodiment, the custom JavaScript will provide a challenge to the HTTP client to ensure that a user of the HTTP client 110A is a human user and not a software program or "bot." In an embodiment, this custom JavaScript may be a "CAPTCHA" type of challenge, and the next HTTP request from the client, including a response to the "CAPTCHA" challenge, may be validated using the validation module.

One or more decision modules 708A-708N may also be configured to look for and modify or remove sensitive data in HTML or other text messages. For example, a credit card number or social security number can be detected and removed or masked. While these are just a few examples of the decision module logic, a wide variety of possibilities exist for what the decision modules can search for and do upon finding a match, and thus, the examples of this disclosure are illustrative and are not to be viewed as limiting.

One possible action that a decision module (e.g. 708A) can create is a "block" 712 request, which indicates that the encryption layer connection is to be terminated. In an embodiment, the block request 712 will cause the client- and server-side transport modules 302-304 to transmit "reset" packets 716 to both the HTTP client 110A and the WAS 130A, thereby causing the connection to be terminated. Another possible action is "accept" 714, which may optionally be accompanied by further actions indicated by one or more encryption layer change requests 710.

When a change module 718 receives just an "accept" 714 and is in mode 'B1A' 208 or 'B2A' 214, the change module 718 causes 720 the client- and server-side transport modules 302-304 to send the originally received packets 741, which as described earlier have been cached.

If the change module 718 receives one or more encryption layer change requests, the change module 718 will apply the changes. The change module 718 will also calculate a hash value for the modified or unmodified plaintext record 724. Next, the change module 718 will send the modified plaintext record 724 (or original plaintext record 724, if the current connection mode is in 'B2B' 116 as SSL or TLS v1.0, which rely upon cipher block chaining, and thus continued re-generation of encrypted packets is required when at least one previous record has been changed) to the generate record and encryption module 726. At this stage, the generate record and encryption module 726 will build an encryption layer header, split the modified or unmodified plaintext record 724 into multiple encryption records if necessary (e.g., due to size constraints dictated by the particular protocol), and add the generated hash, to generate one or more encrypted records 728. The encrypted record(s) 728 are passed, using transport layer "add" requests 730, to the server-side transport module 304, where packets carrying the modified encrypted records 740 are sent to the WAS 130A.

Figure 8:
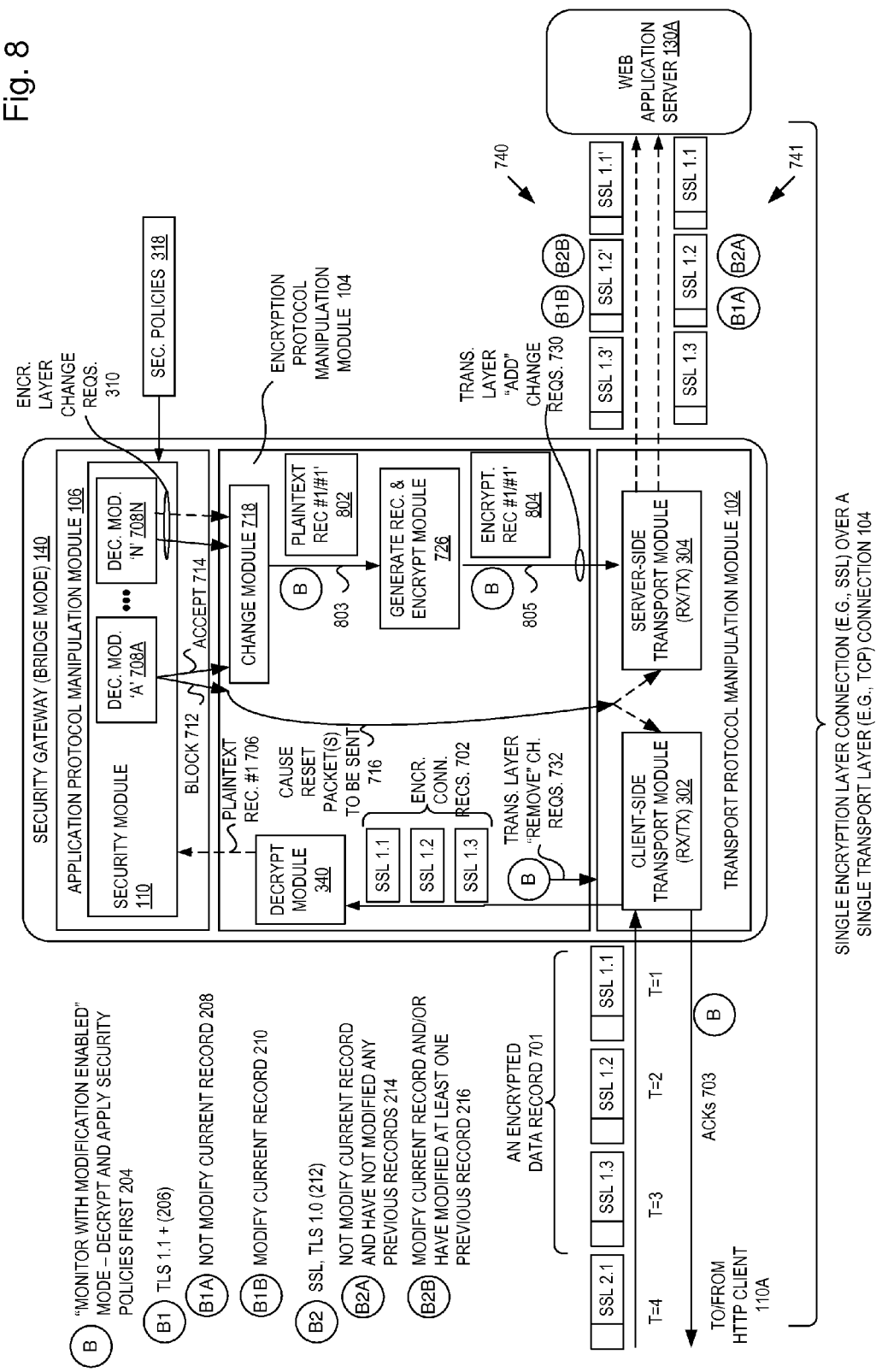
FIG. 8 is a block diagram illustrating a transparent security gateway operable to selectively modify encrypted data records transported over an encryption layer connection in a "monitor with modification enabled" mode using a memory optimization technique according to certain embodiments of the invention.

FIG. 8 is a block diagram illustrating a transparent security gateway operable to selectively modify encrypted data records of an encryption layer connection in a "monitor with modification enabled" mode 204 using a memory optimization technique according to certain embodiments of the invention. Although FIG. 8 is similar to the embodiment of FIG. 7, in contrast the security gateway 140 of FIG. 8 employs a memory optimization technique that reduces the need for memory resources at the expense of utilizing additional processing (e.g., encryption) resources—original received packets are not cached during processing. In this embodiment, processing is the same as FIG. 7, except if the decision modules 708A-708N deem the packets carrying an encrypted data record 701 to be sent or modified and sent, the original or modified plaintext records 802 will be sent 803 to the generate record and encrypt module 726, and the resulting encrypted records 804 are sent 805 to the server-side transport module 304 to be packetized and sent.

Although not illustrated in FIG. 7 and FIG. 8, these embodiments may also be configured to process encrypted data records of an encryption layer connection in a "monitor only" mode 202. In such an embodiment, processing remains largely the same aside from a few changes. First, the encryption protocol manipulation module 104 does not issue transport layer "remove" change requests 732 to the transport protocol manipulation module 102; instead, the transport protocol manipulation module 102, after providing copies of the encrypted connection records 702 to the encryption protocol manipulation module 104, sends out the received packets on to the WAS 130A. In some embodiments, the change module 718, upon receiving any encryption layer change requests 310, will cause that encryption layer connection to switch from the "monitor only" mode 202 to the "monitor with modification enabled" mode 204. Thus, the security gateway 140 will then be able to selectively modify the next encrypted data records that arrive for that encryption layer connection, because the packets carrying the current encrypted data record 701 have already been sent on to the WAS 130A.

Figure 9:
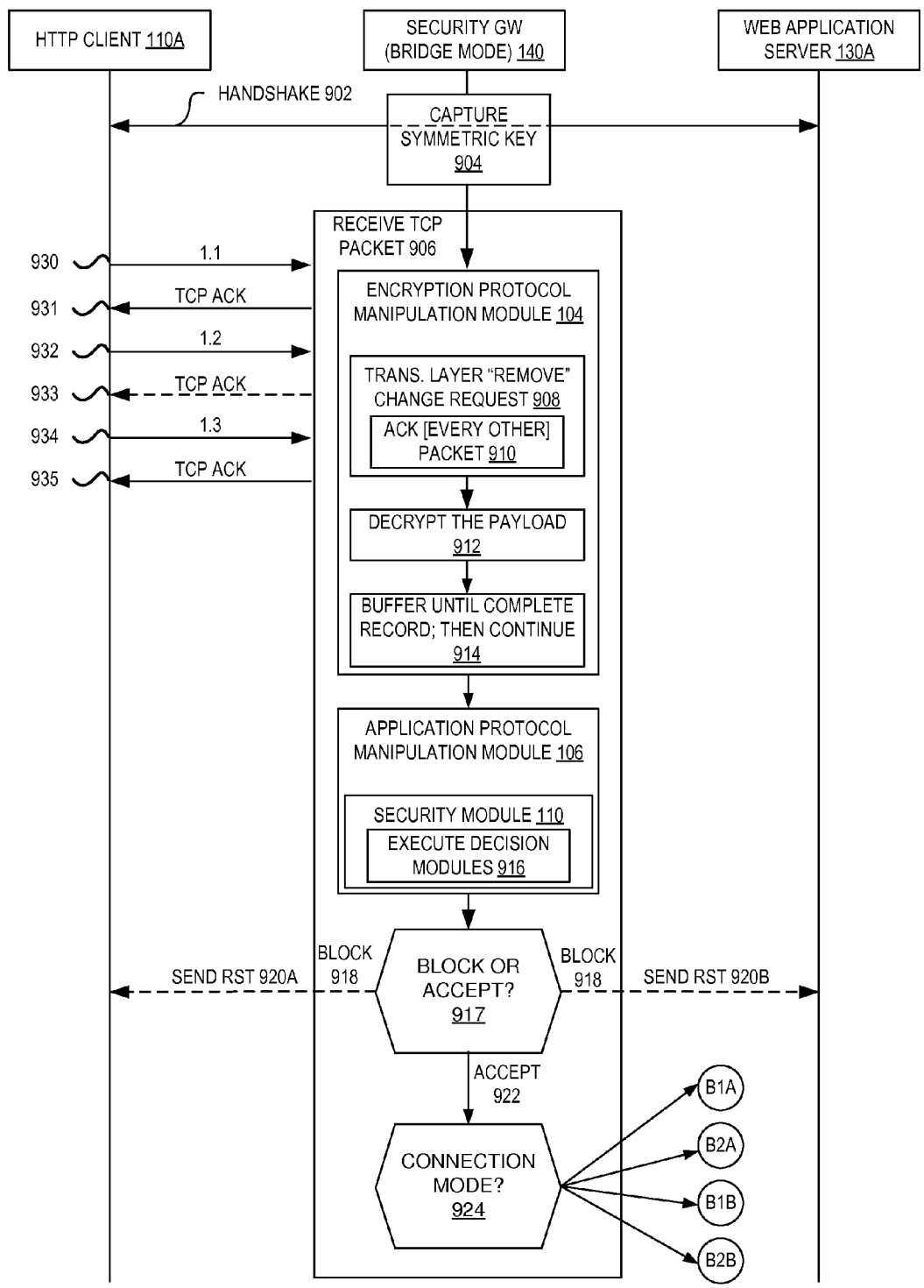
FIG. 9 is a combined sequence and flow diagram illustrating a transparent security gateway operating between an HTTP client and a web application server, which is operable to modify encrypted data records transported over an encryption layer connection according to certain embodiments of the invention.

FIG. 9 is a combined sequence and flow diagram illustrating a transparent security gateway 140 operating between an HTTP client 110A and a web application server 130A, which is operable to modify encrypted data records of an encryption layer connection according to certain embodiments of the invention. As described with respect to FIG. 5, the HTTP client 110A and the WAS 130A perform a handshake 902, where the security gateway 140 is able to capture the established symmetric key 904.

With a symmetric key established, the HTTP client 110A and the WAS 130A will begin data transmission. In this depicted example, the HTTP client 110A begins transmission by sending three packets (930, 932, 934) carrying an encryption record (i.e., an encrypted application layer payload). In some embodiments, the security gateway 140 will transmit acknowledgements (i.e., one or more of TCP ACKs 931, 933, 935) to allow the HTTP client 110A to continue transmitting new data-carrying packets and not attempt to retransmit packets (930, 932, and 934) while the security gateway 140 is processing them. In various embodiments, the security gateway 140 may be configured to transmit acknowledgements after every received packet (i.e., send all of 931, 933, and 935) or after every other packet (i.e., send 931 and 935 but not 933). In other embodiments, other configurations may be utilized—perhaps utilizing different interfaces.

Upon receipt of a packet 906, the encryption protocol manipulation module 104 will being processing by internally issuing a transport layer "remove" change request 908 (e.g., to the transport protocol manipulation module 102), causing the security gateway 140 to not immediately send the received packet 906 on to the WAS 130A. In an embodiment, the security gateway 140 will also send an acknowledgement 910, which may occur after every other received packet of an encryption layer connection.

The encryption protocol manipulation module 104 will then decrypt 912 the payload of the packet using the captured 904 symmetric key, and buffer 914 the decrypted portions until a complete plaintext record has been generated. At that point, the application protocol manipulation module 106, using a security module 110, will execute 916 one or more decision modules to determine if the plaintext record should continue on to the destination WAS 130A and if any changes need to be made to the plaintext record.

At 917, if the decision modules have determined that the plaintext record should not be sent, the encryption layer connection is to be blocked 918 and the security gateway 140 will transmit reset messages to both the HTTP client 110A at 920A and to the WAS 130A at 920B. However, if the plaintext record is allowable (i.e., accepted at 922), processing will continue 924 based upon the connection mode 924 of the encryption layer connection.

Figure 10:
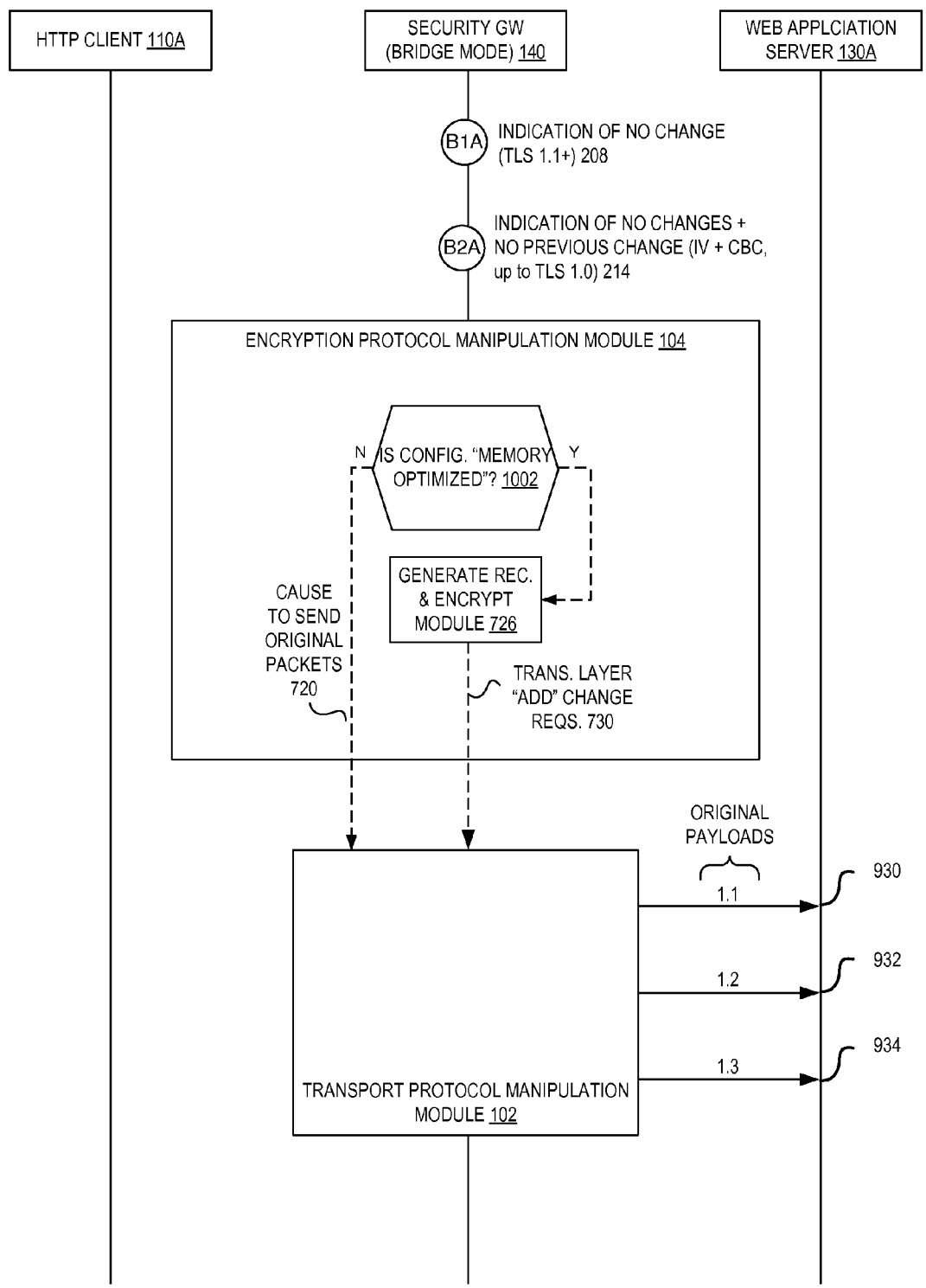
FIG. 10 is a combined sequence and flow diagram continuing the "B1A" and "B2A" paths of FIG. 9 according to certain embodiments of the invention.

FIG. 10 is a combined sequence and flow diagram continuing the "B1A" and "B2A" paths of FIG. 9 according to certain embodiments of the invention. If the connection mode is to be 'B1A' 208 where the connection utilizes TLS version 1.1 or greater and there is not a change request issued requiring a change to the plaintext record, or if the connection mode is to be 'B2A' 214 where the connection utilizes TLS version 1.0 or a version of SSL (where an initialization vector (IV) and cipher-block chaining (CBC) are used during encryption) and there is not a change request issued requiring a change to the plaintext record and no previous change has been made to the encrypted data of the connection, then processing continues as described in FIG. 10. In an embodiment, decision block 1002 illustrates options based upon configuration, and not an actual set of determinations (e.g., "Weise" code statements, logical hardware equivalents) used by the security gateway 140.

If the security gateway 140, for all connections or just this encryption layer connection, is configured in the "memory optimized" mode (see FIG. 8, where memory requirements are reduced at the expense of increased processing), then the encryption protocol manipulation module 104 will use its generate record and encrypt module 726 to create a set of one or more encrypted records (and associated HMACs, etc.) and issue a set of one or more transport layer "add" change requests 730 to cause the transport protocol manipulation module 102 to packetize the one or more encrypted records and send out those packets (930, 932, 934).

If, however, the security gateway 140, for all connections or just this encryption layer connection, is configured in the "processing optimized" mode (see FIG. 7, where processing requirements are reduced at the expense of increased memory utilization), the encryption protocol manipulation module 104 will cause 720 the transport protocol manipulation module 102 to send the original packets (930, 932, 934).

Figure 11:
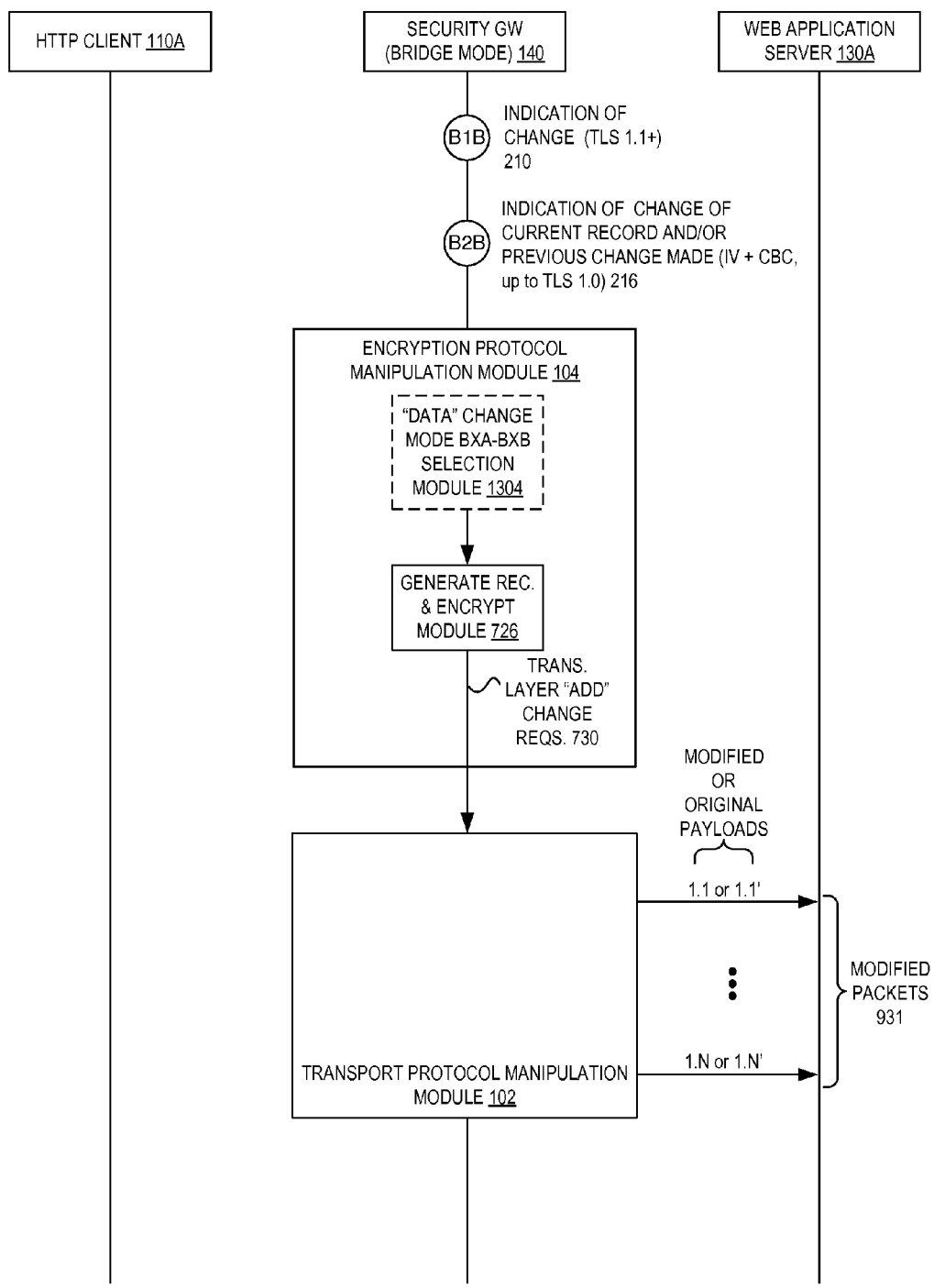
FIG. 11 is a combined sequence and flow diagram continuing the "B1B" and "B2B" paths of FIG. 9 according to certain embodiments of the invention.

FIG. 11 is a combined sequence and flow diagram continuing the "BM" and "B2B" paths of FIG. 9 according to certain embodiments of the invention. If the connection mode is to be 'B1B' 210 where the connection utilizes TLS version 1.1 or greater and there is a change request issued requiring a change to the plaintext record, or if the connection mode is to be 'B2B' 216 where the connection utilizes TLS version 1.0 or a version of SSL (where an initialization vector (IV) and cipher-block chaining (CBC) are used during encryption) and there is a change request issued requiring a change to the plaintext record and/or a previous change has been made to the encrypted data of the connection (as a previous change will require changes to all subsequent encrypted packets due to the use of the IV and CBC), then processing continues as described in FIG. 11.

The encryption protocol manipulation module 104 may begin by utilizing a "data" change BXA-BXB (where 'X' represents either '1' or '2', and thus represents B1A-B1B or B2A-B2B) selection module 1304 (described in greater detail later in FIGS. 13 and 14) to change the connection mode for the encryption layer connection if the previous mode was either 'B1A' or 'B2A'. Next, because a change is to be made to the plaintext record or because a previous change has been made requiring the plaintext record to be re-encrypted, the encryption protocol manipulation module 104 will use its generate record and encrypt module 726 to create a set of one or more encrypted records (and associated HMACs, etc.) and issue a set of one or more transport layer "add" change requests 730 to cause the transport protocol manipulation module 102 to packetize the one or more encrypted records (containing either the same plaintext [e.g., 1.1] or modified plaintext [e.g., 1.1']) and send out those modified packets 931, which may be more or fewer packets than the received packets (930, 932, 934) due to possible modification to the plaintext.

Transparent Modification of Data Split Over Multiple Encryption Records

Figure 12:
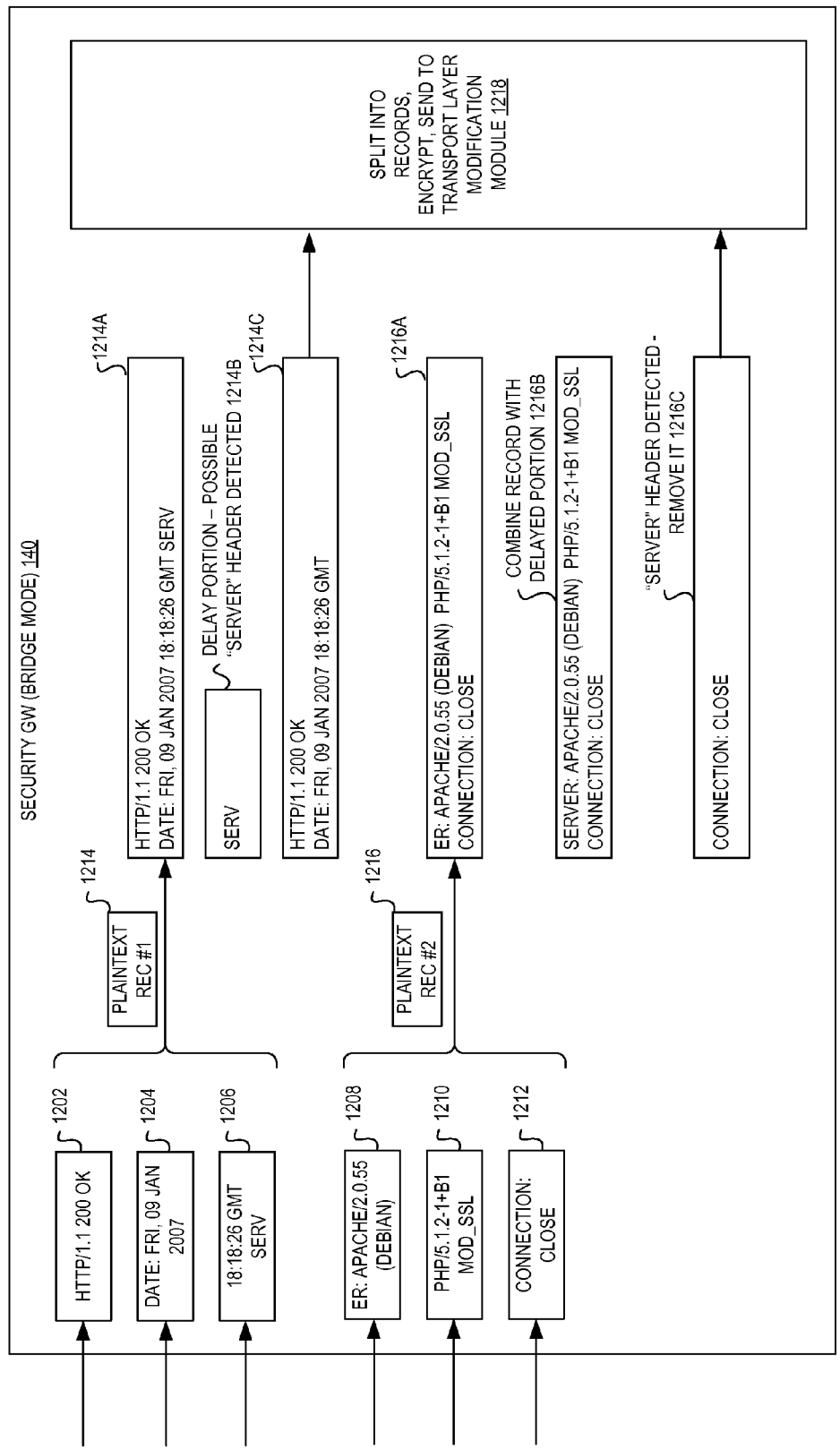
FIG. 12 is a diagram illustrating modifying encrypted data split over multiple encryption data records according to certain embodiments of the invention.

FIG. 12 is a diagram illustrating modifying encrypted data split over multiple encryption data records according to certain embodiments of the invention. In the depicted embodiment, the security gateway 140 first receives a set of one or more packets (1202, 1204, 1206) that collectively transport an encryption record, which is decrypted into a first plaintext record 1214 and analyzed at 1214A. In this depicted example, the received packets (1202, 1204, 1206) are an HTTP response message sent by a WAS (e.g., 130A). The security module 110 may utilize one or more decision modules configured to examine HTTP response messages using security policies 318, and may detect that a possible security issue might exist in this plaintext record and subsequent plaintext records—that the WAS 130A might be sending a "Server" HTTP header, which reveals too much information about the WAS 130A and is to be stripped from HTTP response messages, per the security policies 318. In this example, by detecting the existence of "SERV" 1214B in the plaintext record 1214, the security gateway 140 will delay the transmission of this portion of the plaintext record 1214. Accordingly, the security gateway 140 may issue encryption layer change requests to remove the "SERV" in the current plaintext record 1214A to generate a new plaintext record 1214C, which is then, at 1218, split into one or more encryption records, encrypted, and sent to the transport layer modification module to be packetized and transmitted on to the ultimate recipient.

When the security gateway 140 receives a next set of packets (1208, 1210, 1212) collectively carrying an encrypted data record, the encrypted data record is decrypted using a captured symmetric key to yield a second plaintext record 1216. This second plaintext record is analyzed 1216A, together with the delayed "SERV" 1214B as a combined plaintext record 1216B. At this point, the security module 110 will detect that the "SERV" 1214B portion was part of a prohibited HTTP header ("SERVER: Apache/2.0.55 (Debian) PHP/5.1.2-1+b1 mod_ss1"), which is to be removed from the current plaintext record 1216C. The current plaintext record 1216C is then at 1218, split into one or more encryption records, encrypted, and sent to the transport layer modification module to be packetized and transmitted on to the ultimate recipient. If the delayed portion 1214B had not, in fact, been part of a prohibited HTTP header, the security gateway 140 may have transmitted the entire combined record 1216B to the ultimate recipient.

Exemplary Security Gateway with Multi-Mode Implementation

Figure 13:
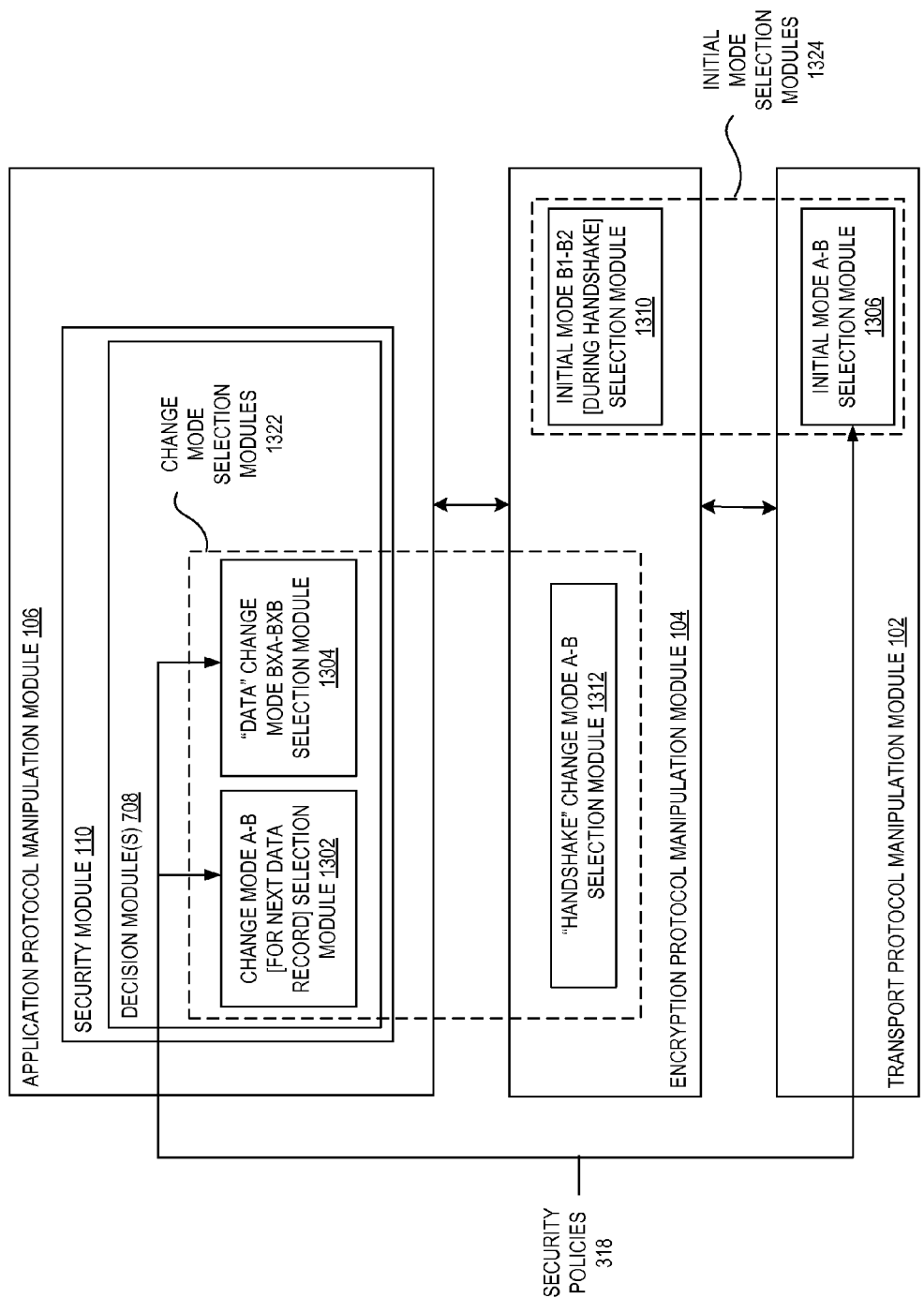
FIG. 13 is a block diagram illustrating modules of a transparent security gateway operable to selectively modify encrypted application layer data transported over encryption layer connections according to certain embodiments of the invention.

FIG. 13 is a block diagram illustrating modules of a transparent security gateway operable to selectively modify encrypted application layer data transported over encryption layer connections according to certain embodiments of the invention. FIG. 13 illustrates the modules allowing the security gateway 140 to operate in a variety of connection modes 200 and dynamically switch between those modes, enabling the security gateway 140 to operate using its processing and memory resources extremely efficiently. The security gateway 140, in the depicted embodiment, includes multiple "change mode" selection modules 1322 and multiple "initial mode" selection modules 1324.

The "initial mode" selection modules 1324 allow for an initial connection mode 200 to be selected for an encryption layer connection, which may occur at the beginning of an encryption handshake (using the initial mode A-B selection module 1306 to, e.g., select between mode 'A' for "monitor only" mode 202 and mode 'B' for "monitor with modification enabled" mode 204) or during the encryption handshake (using the initial mode B1-B2 selection module 1310 to, e.g., select between mode 'B1' for TLS v1.1 or greater 206 or mode 'B2' for SSL or TLS v1.0 212).

The "change mode" selection modules 1322 allow for modes to be changed, after they have been initially determined or set, during the encryption handshake (using the handshake change mode A-B selection module 1312) or during the normal "data" transmission portion of the encryption layer connection (using the change mode A-B for next data record selection module 1302 and/or data change mode BXA-BXB selection module 1304).

Additionally, in an embodiment, the change mode A-B for next data record selection module 1302, the data change mode BXA-BXB selection module 1304, and the initial mode A-B selection module may be based upon configured security policy 318. In contrast, in the depicted embodiment, the initial mode B1-B2 handshake selection module 1310 and the handshake change mode A-B selection module 1312 are dependent upon the handshake data transmitted between the client and server, which is further detailed in FIG. 14 with respect to some embodiments of the invention.

Figure 14:
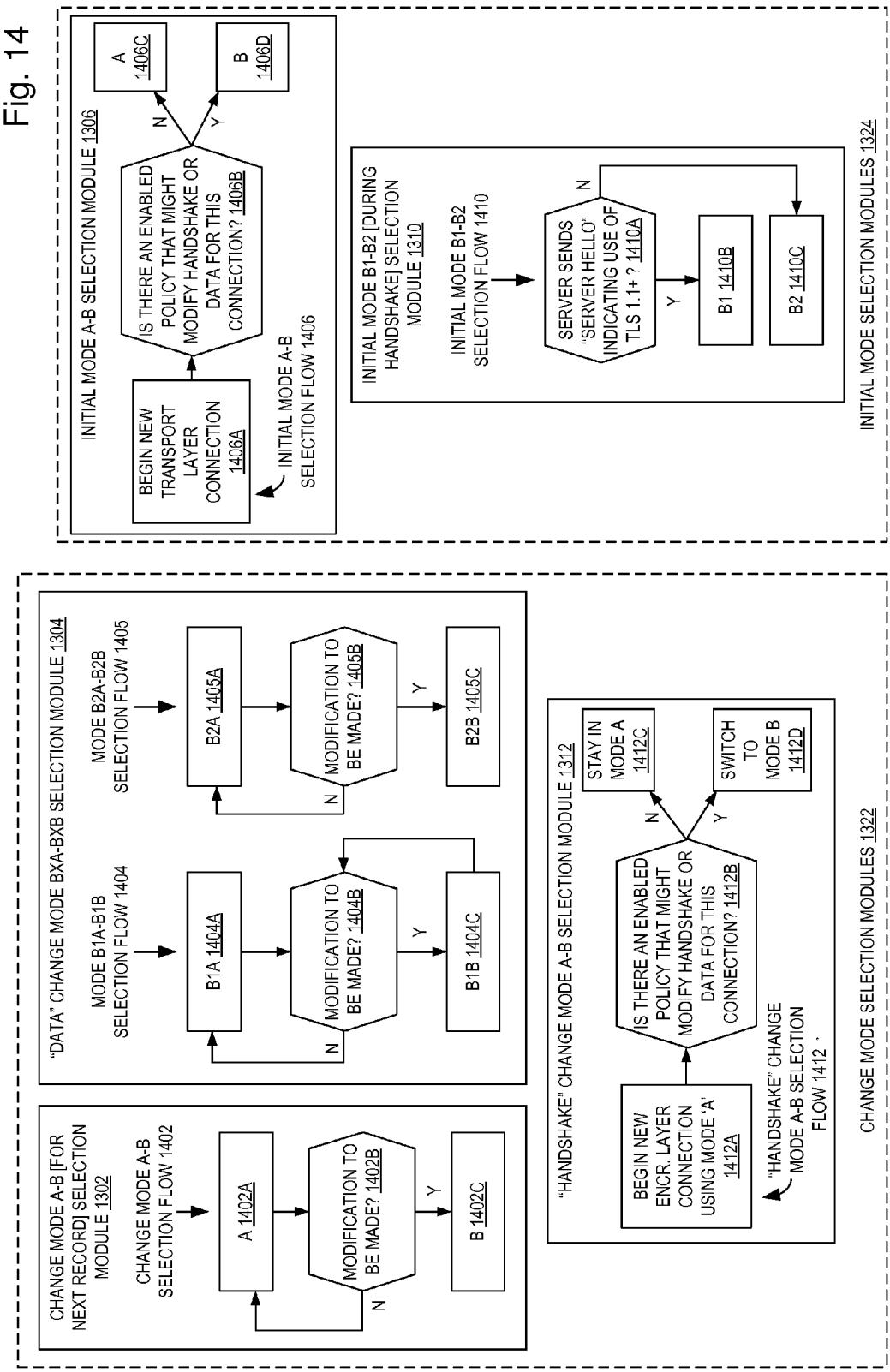
FIG. 14 illustrates flows utilized by the modules depicted in FIG. 13 of a transparent security gateway operable to selectively modify encrypted application layer data transported over encryption layer connections according to certain embodiments of the invention.

FIG. 14 illustrates flows utilized by the modules depicted in FIG. 13 of a transparent security gateway operable to selectively modify encrypted application layer data transported over encryption layer connections according to certain embodiments of the invention.

The three change mode selection modules 1322 of FIG. 13 are illustrated. According to an embodiment of the invention, the change mode A-B for next data record selection module 1302 may utilize a flow 1402. If the connection mode 200 for an encryption layer connection is in "monitor only" mode 202 (represented by 'A') as represented by block 1402A, when a plaintext data record is examined and no modification 1402B is to be made to the next records, the change mode A-B for next data record selection module 1302 determines to stay in the same mode A 1402A. However, if a modification 1402B to the next plaintext record is expected, the change mode A-B for next data record selection module 1302 determines to switch to mode 'B', which is "monitor with modification enabled mode" 204, as represented by block 1402C. In the depicted embodiment of the invention, once mode 'B' 204 has been entered during the encryption data record stage of the encryption layer connection, the security gateway 140 will remain in mode 'B' 204, but in other non-illustrated embodiments, it may be possible to switch back to mode 'A' 202 mode. Examples of modifications 1402B causing such a switch to mode 'B' may include, but are not limited to, receiving an HTTP request message from an HTTP client 110A that requests, from WAS 130A, a particular URL of a web application that is known to transmit responses needing to be modified, for example, to inject a JavaScript script into the response. Switching from mode 'A' to 'B' at the point of observing an HTTP request for an HTTP response that might need to be modified allows the security gateway 140 to temporarily stop the packets carrying the HTTP response from being instantly transmitted through to the HTTP client 110A (which occurs in mode 'A').

According to an embodiment of the invention, the data change mode BXA-BXB selection module 1304 may utilize one or both of flows 1404 and 1405. Flow 1404 represents a mode B1A-B1B selection flow. In this flow 1404, if the connection mode 200 is 'MA' 208 ("monitor with modification enabled" 204 using TLS v1.1+206 and with no modification to a current record 208), and no modification is to be made to the current record 1404B, the data change mode BXA-BXB selection module 1304 will remain in mode 'B1A' 208. However, if a change is to be made to the current record 1404B, the data change mode BXA-BXB selection module 1304 will switch to connection mode 200 of 'B1B' 210 ("monitor with modification enabled" 204 using TLS v1.1+ 206 and with a modification to the current record 210) as represented by block 1404C. While in mode 'B1B' 210, if, for next current record, no modification 1404B is to be made, the mode will switch back to mode 'B1A' 208; otherwise, the mode will remain in mode 'B1B' 210. Examples of modifications (1404B, 1405B) causing such a switch to either 'BM' or 'B2B' may include, but are not limited to, receiving an HTTP response including a "Server" or "X-Powered-By" header (to be removed), receiving a record containing the end of the HTTP headers (where a custom cookie may be added), receiving a particular HTTP response page (where JavaScript is to be injected), receiving a particular HTTP response page that includes a form is being sent to a suspected "bot" (where JavaScript is to be injected), and/or receiving a particular HTTP response page known to typically contain sensitive information (where the information is to be removed or obscured).

Flow 1405 represents a mode B2A-B2B selection flow. In this flow 1405, if the connection mode 200 is 'B2A' 214 ("monitor with modification enabled" 204 using SSL or TLS v1.0 212 and with no modification to a current record and no previous modifications 214), and no modification 1405B is to be made to the current record, the data change mode BXA-BXB selection module 1304 will remain in mode 'B1A' 208. However, if a modification 1405B is to be made to the current record, the data change mode BXA-BXB selection module 1304 will switch connection modes 200 to 'B2B' 216 ("monitor with modification enabled" 204 using SSL or TLS v1.0 212 and with a modification to a current record and/or a previous modification 216) as represented by block 1405C. In contrast to flow 1404, where it is possible to move from block 1404C ('B1B') to block 1404A ('B1A'), it is not possible in flow 1405 to move from block 1405C ('B2B') to block 1405A ('B2A') because once a change is made to a plaintext data record, all subsequent plaintext data records must be re-encrypted due to the first IV for a record, in SSL and TLS v1.0, being taken from a last IV of a previous record; in contrast, for TLS v1.1 and greater, each record starts with its own random IV. Examples of an enabled policy being enabled 1412B causing a switch to mode 'B' may include, but are not limited to, receiving a message directed toward a server (e.g. WAS 130A) to which server type obfuscation is enabled.

According to an embodiment of the invention, the handshake change mode A-B selection module 1312 may utilize a flow 1412 during the processing of handshake messages. Initially, a new encryption layer connection begins using mode 'A' ("monitor only" mode 202) at block 1412A. Then, an analysis occurs to determine whether there is an enabled policy 318 that might potentially modify the handshake or the data for the connection 1412B. If so, the handshake change mode A-B selection module 1312 will switch to mode 'B' 204 ("monitor with modification enabled" 204) at block 1412D; otherwise, the mode will remain in mode 'A' 202 at block 1412C.

FIG. 14 also illustrates the two initial mode selection modules 1324 of FIG. 13. According to an embodiment of the invention, the initial mode A-B selection module 1306 may utilize a flow 1406. When an establishment of a new transport connection is first observed at the security gateway 140 at block 1406A, the security gateway 140 will determine whether there is an enabled policy that might modify the handshake or data for that transport layer connection 1406B. If so, the connection mode 200 is set to mode 'B' 204 ("monitor with modification enabled" 204) at block 1406D; otherwise, the initial mode is set to mode 'A' ("monitor only" mode 202) at block 1406C.

According to an embodiment of the invention, the initial mode B1-B2 selection module 1310 may utilize a flow 1410, which may only be performed if the connection mode 200 has already been set to mode 'B' 204 by the initial mode A-B selection module 1306. If, at block 1410A, the initial mode B1-B2 selection module 1310 detects that a received encryption protocol plaintext record is a "Server Hello" message that indicates that TLS version 1.1 or greater has been selected, the initial mode B1-B2 selection module 1310 selects connection mode 200 'B1' 206 ("monitor with modification enabled" mode 204 using TLS v1.1+206) at block 1410B; otherwise, connection mode 'B2' 212 ("monitor with modification enabled" mode 204 using SSL or TLS v1.0 212) is selected at block 1410C.

Exemplary Deployment Environment

FIG. 15 illustrates exemplary deployment environments of a security gateway 140 operating as an inline transparent layer 2 bridge or layer 3 router 141 and operable to selectively modify encrypted application layer data transported over encryption layer connections according to certain embodiments of the invention. Specifically, FIG. 15 illustrates one or more HTTP clients 110A-110N residing on one or more client end stations 1505A-1505N, which connect, through a security gateway 140, to one or more web application servers 130A-130N executing on server hardware 1525 in a data center 1520. In an embodiment, the security gateway 140 and the one or more web application servers 130A-130N operate within a LAN, and the one or more client end stations 1505A-1505N operate outside of the LAN and connect through a WAN (e.g., the Internet).

The security policies 318 are illustrated as being hosted in a management server 1560 that is coupled to the security gateway 140. The security policies 318 (and updates to the security policies 318) may be transmitted by the management server 1560 to the security gateway 140, or the security gateway 140 may have a type of read access to the management server 1560 enabling it to fetch/pull the security policies 318 (and/or updates to the security policies 318). In this figure, the security gateway 140 is illustrated as executing on a network device 1510 and being communicatively coupled between the client end stations 1505A-1505N and a data center 1520. The data center 1520 includes server hardware 1525 (i.e., one or more computing devices) on which is executing one or more web application servers 130A-130N. The client end stations 1505A-1505N represent client end stations that are accessing one of the web application servers (e.g., 130A), and thus may be accessing through a web interface. Such client end stations 1505A-1505N are typically located outside of a private network of which the security gateway 140 and data center 1520 are a part. However, as illustrated using the dashed lines, in other embodiments the security gateway 140B is implemented on the server hardware 1525, or the security gateway 140C is implemented as part of one or more of the web application servers (e.g., 130A). Moreover, in some embodiments, the security gateway 140 executes on the network device 1510, which is also within the same data center 1520B as the server hardware 1525 executing the web application servers 130A-130N. In some embodiments, the management server 1560 is also within a same data center 1520C as the security gateway 140 and the server hardware 1525 executing the web application servers 130A-130N.

Alternative Embodiments

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a security gateway coupled between a client end station and a web application server (WAS), wherein a protocol stack used between the client end station and the WAS includes an application layer that carries application layer data, an encryption layer under the application layer to carry and encrypt the application layer data, and a transport layer to carry the encryption layer, wherein the encryption layer and the transport layer respectively allow for an encryption layer connection carried over a transport layer connection to be established between the client end station and the WAS to encrypt and transmit application layer data between them, wherein the security gateway includes a transport protocol layer manipulation module capable of making necessary changes at the transport layer to accommodate modifications made to traffic transmitted between the client end station and the WAS at higher layers of the protocol stack, wherein the changes comprise modifying transport layer headers of packets and generating additional packets to acknowledge or retransmit modified data, the method to improve security through modification in the security gateway of application layer data even though that application layer data was encrypted and transmitted using the encryption layer connection that is between the client end station and WAS and is not terminated by the security gateway, the method comprising:

monitoring, in the security gateway implemented in an electronic device, a handshake between the client end station and the WAS that follows a handshake protocol to establish the encryption layer connection over the transport layer connection, wherein the security gateway is transparent and thus does not terminate the encryption layer connection or the underlying transport layer connection, wherein the handshake is to generate a symmetric key to be utilized by the client end station and the WAS when encrypting and decrypting application layer data to be sent using the encryption layer connection, wherein the monitoring includes the security gateway learning the symmetric key using a private key of the WAS;

receiving, at the security gateway, an encrypted connection record sent from the WAS and destined to the client end station using the encryption layer connection, the encrypted connection record being the result of the WAS having encrypted a plaintext connection record comprising one or more application layer payloads;

transmitting, from the security gateway to the client end station using the encryption layer connection carried on the transport layer connection, a set of one or more encrypted modified connection records generated by the security gateway instead of the encrypted connection record sent by the WAS, wherein the set of encrypted modified connection records are the result of the security gateway having, decrypted the encrypted connection record using the symmetric key to yield the plaintext connection record, modified the plaintext connection record by inserting, into the plaintext connection record, a custom Hypertext Transfer Protocol (HTTP) cookie, and encrypted the modified plaintext connection record using the symmetric key;

receiving, at the security gateway, another encrypted connection record sent from the client end station and destined to the WAS over the encryption layer connection; and responsive to an HTTP cookie of the another encrypted connection record not matching the custom HTTP cookie, stopping the another encrypted connection record from being sent to the WAS.

2. The method of claim 1, further comprising:

receiving, at the security gateway, a second encrypted connection record sent from the WAS and destined to the client end station over the encryption layer connection, the second encrypted connection record being the result of the WAS having encrypted a second plaintext connection record comprising a second set of one or more application layer payloads;

responsive to determining that a first portion of the second plaintext connection record is to be temporarily held by the security gateway, transmitting, from the security gateway to the client end station over the encryption layer connection, a third encrypted connection record, the third encrypted connection record being the result of the security gateway having encrypted all of the second plaintext connection record that is not the first portion;

receiving, at the security gateway, a fourth encrypted connection record sent from the WAS and destined to the client end station over the encryption layer connection, the fourth encrypted connection record being the result of the WAS having encrypted a fourth plaintext connection record comprising a fourth set of one or more application layer payloads; and transmitting, from the security gateway to the client end station over the encryption layer connection, a fifth encrypted connection record, the fifth encrypted connection record being the result of the security gateway having modified the first portion and encrypted the modified first portion and at least a portion of the fourth plaintext connection record.

3. The method of claim 1, wherein said monitoring of the handshake between the client end station and the WAS comprises:

receiving, at the security gateway, a handshake message sent from the client end station and destined to the WAS over the transport layer connection as part of the handshake;

transmitting, to the WAS over the transport layer connection, a modified handshake message as part of the handshake instead of the handshake message;

receiving, at the security gateway, an encrypted finished handshake message sent from the client end station and destined to the WAS over the encryption layer connection as part of the handshake, the encrypted finished handshake message being the result of the client end station having encrypted a plaintext finished handshake message, the plaintext finished handshake message being the result of the client end station utilizing a hash function and a plurality of handshake messages received by and transmitted from the client end station during the handshake; and transmitting, from the security gateway to the WAS over the encryption layer connection, an encrypted modified finished handshake message instead of the encrypted finished handshake message, the encrypted modified finished handshake message being the result of the security gateway having encrypted a plaintext modified handshake message, the plaintext modified handshake message being the result of the security gateway utilizing a hash function and a second plurality of handshake messages received from and transmitted to the client end station by the security gateway during the handshake, wherein at least one of the second plurality of handshake messages is different than a corresponding at least one of the plurality of handshake messages, and wherein the second plurality of handshake messages include the modified handshake message but not the handshake message.

4. The method of claim 3, wherein the modified handshake message includes fewer cipher suite names than the handshake message.

5. The method of claim 1, further comprising:

forwarding, by the security gateway, a second encrypted connection record sent from the WAS over a second encryption layer connection and destined to a second client end station, to the second client end station over the second encryption layer connection, wherein the second encrypted connection record is not modified by the security gateway.

6. An apparatus to improve security by being configured to transparently modify encrypted application layer data to be transmitted between a plurality of client end stations and a set of one or more web application servers (WASs) even though the encrypted application layer data is to be transmitted using encryption layer connections carried over underlying transport layer connections, wherein a protocol stack used between the client end stations and the set of WASs includes an application layer that carries application layer data, an encryption layer under the application layer to carry and encrypt the application layer data, and a transport layer to carry the encryption layer, wherein the encryption layer and the transport layer respectively allow for the encryption layer connections carried over the transport layer connections to be established between the client end stations and the set of WAS s to encrypt and transmit application layer data between them, the apparatus comprising:

a security gateway, in an electronic device, to be transparently coupled between the set of client end stations and the set of WASs, wherein the security gateway is configured to, monitor handshakes between the client end stations and the WASs that follow a handshake protocol to establish the encryption layer connections over the transport layer connections between the client end stations and the set of WASs, wherein the handshakes are to generate symmetric keys to be utilized by the client end stations and the set of WASs when encrypting and decrypting application layer data to be sent over the encryption layer connections, wherein the monitoring includes the security gateway learning the symmetric keys using private keys of the WASs, and wherein the security gateway does not terminate the encryption layer connections or the underlying transport layer connections, receive encrypted connection records being sent between the set of WASs and client end stations over the encryption layer connections, the encrypted connection records being the result of the set of WASs and client end stations having encrypted plaintext connection records that each comprise one or more application layer payloads, and transmit, over the encryption layer connections, modified encrypted connection records generated by the security gateway instead of at least some of the received encrypted connection records, wherein each modified encrypted connection record is to be the result of the security gateway being configured to, decrypt the respective encrypted connection record using the symmetric key of the respective encryption layer connection to yield the plaintext connection record comprising the one or more application layer payloads, modify at least one of the one or more application layer payloads of the plaintext connection record by inserting, into the at least one of the application layer payloads, a custom Hypertext Transfer Protocol (HTTP) cookie, and encrypt the modified plaintext connection record using the respective symmetric key;

stop, subsequent to the insertion of the custom HTTP cookie for the respective encryption layer connection, those of the encrypted connection records received from the client end stations that do not include an HTTP cookie matching the respective custom HTTP cookie from being sent to the respective destination WAS of the set of WASs.

7. The apparatus of claim 6, wherein the security gateway is further configured to:

receive a second encrypted connection record sent from one of the set of WASs and destined to one of the client end stations over the respective encryption layer connection, the second encrypted connection record being the result of the WAS having encrypted a second plaintext connection record comprising a second set of one or more application layer payloads;

responsive to a determination that a first portion of the second plaintext connection record is to be temporarily held by the security gateway, transmit, to the one of the client end stations over the respective encryption layer connection, a third encrypted connection record, the third encrypted connection record being the result of the security gateway having encrypted all of the second plaintext connection record that is not the first portion;

receive a fourth encrypted connection record sent from the one of the set of WASs and destined to the one of the client end stations over the respective encryption layer connection, the fourth encrypted connection record being the result of the one of the set of WASs having encrypted a fourth plaintext connection record comprising a fourth set of one or more application layer payloads; and transmit, to the one of the client end stations over the respective encryption layer connection, a fifth encrypted connection record, the fifth encrypted connection record being the result of the security gateway having modified the first portion and encrypted the modified first portion and at least a portion of the fourth plaintext connection record.

8. The apparatus of claim 6, wherein the security gateway, to monitor the handshakes between each of the client end stations and each of the set of WASs, is further configured to:

receive a handshake message sent from the client end station and destined to the WAS over the transport layer connection as part of the handshake;

transmit, to the WAS over the transport layer connection, a modified handshake message as part of the handshake instead of the handshake message;

receive an encrypted finished handshake message sent from the client end station and destined to the WAS over the encryption layer connection as part of the handshake, the encrypted finished handshake message being the result of the client end station having encrypted a plaintext finished handshake message, the plaintext finished handshake message being the result of the client end station utilizing a hash function and a plurality of handshake messages received by and transmitted from the client end station during the handshake; and transmit, to the WAS over the encryption layer connection, an encrypted modified finished handshake message instead of the encrypted finished handshake message, the encrypted modified finished handshake message being the result of the security gateway having encrypted a plaintext modified handshake message, the plaintext modified handshake message being the result of the security gateway utilizing a hash function and a second plurality of handshake messages received from and transmitted to the client end station by the security gateway during the handshake, wherein at least one of the second plurality of handshake messages is different than a corresponding at least one of the plurality of handshake messages, and wherein the second plurality of handshake messages include the modified handshake message but not the handshake message.

9. The apparatus of claim 8, wherein the modified handshake message includes fewer cipher suite names than the handshake message.

10. The apparatus of claim 6, wherein the security gateway is further configured to:

forward a second encrypted connection record, sent from one of the set of WASs over a second encryption layer connection and destined to one of the set of client end stations, to the one client end station over the second encryption layer connection, wherein the second encrypted connection record is not modified by the security gateway.

11. A non-transitory computer readable storage medium storing instructions which, when executed by one or more processors of a computing device, cause the computing device to implement a security gateway to be coupled between a client end station and a web application server (WAS), wherein a protocol stack used between the client end station and the WAS includes an application layer that carries application layer data, an encryption layer under the application layer to carry and encrypt the application layer data, and a transport layer to carry the encryption layer, wherein the encryption layer and the transport layer respectively allow for an encryption layer connection carried over a transport layer connection to be established between the client end station and the WAS to encrypt and transmit application layer data between them, wherein the security gateway includes a transport protocol layer manipulation module capable of making necessary changes at the transport layer to accommodate modifications made to traffic transmitted between the client end station and the WAS at higher layers of the protocol stack, wherein the changes comprise modifying transport layer headers of packets and generating additional packets to acknowledge or retransmit modified data, wherein the security gateway is to improve security through modification in the security gateway of application layer data even though that application layer data was encrypted and transmitted using the encryption layer connection that is between the client end station and WAS and is not terminated by the security gateway by performing operations comprising:

monitoring a handshake between the client end station and the WAS that follows a handshake protocol to establish the encryption layer connection over the transport layer connection, wherein the security gateway is transparent and thus does not terminate the encryption layer connection or the underlying transport layer connection, wherein the handshake is to generate a symmetric key to be utilized by the client end station and the WAS when encrypting and decrypting application layer data to be sent using the encryption layer connection, wherein the monitoring includes the security gateway learning the symmetric key using a private key of the WAS;

receiving an encrypted connection record sent from the WAS and destined to the client end station using the encryption layer connection, the encrypted connection record being the result of the WAS having encrypted a plaintext connection record comprising one or more application layer payloads;

transmitting, to the client end station using the encryption layer connection carried on the transport layer connection, a set of one or more encrypted modified connection records generated by the security gateway instead of the encrypted connection record sent by the WAS, wherein the set of encrypted modified connection records are the result of the security gateway having, decrypted the encrypted connection record using the symmetric key to yield the plaintext connection record, modified the plaintext connection record by inserting, into the plaintext connection record, a custom Hypertext Transfer Protocol (HTTP) cookie, and encrypted the modified plaintext connection record using the symmetric key;

receiving another encrypted connection record sent from the client end station and destined to the WAS over the encryption layer connection; and responsive to an HTTP cookie of the another encrypted connection record not matching the custom HTTP cookie, stopping the another encrypted connection record from being sent to the WAS.

12. The non-transitory computer readable storage medium of claim 11, wherein the operations further comprise:

receiving a second encrypted connection record sent from the WAS and destined to the client end station over the encryption layer connection, the second encrypted connection record being the result of the WAS having encrypted a second plaintext connection record comprising a second set of one or more application layer payloads;

responsive to determining that a first portion of the second plaintext connection record is to be temporarily held by the security gateway, transmitting, to the client end station over the encryption layer connection, a third encrypted connection record, the third encrypted connection record being the result of the security gateway having encrypted all of the second plaintext connection record that is not the first portion;

receiving a fourth encrypted connection record sent from the WAS and destined to the client end station over the encryption layer connection, the fourth encrypted connection record being the result of the WAS having encrypted a fourth plaintext connection record comprising a fourth set of one or more application layer payloads; and transmitting, to the client end station over the encryption layer connection, a fifth encrypted connection record, the fifth encrypted connection record being the result of the security gateway having modified the first portion and encrypted the modified first portion and at least a portion of the fourth plaintext connection record.

13. The non-transitory computer readable storage medium of claim 11, wherein said monitoring of the handshake between the client end station and the WAS comprises:

receiving a handshake message sent from the client end station and destined to the WAS over the transport layer connection as part of the handshake;

transmitting, to the WAS over the transport layer connection, a modified handshake message as part of the handshake instead of the handshake message;

receiving an encrypted finished handshake message sent from the client end station and destined to the WAS over the encryption layer connection as part of the handshake, the encrypted finished handshake message being the result of the client end station having encrypted a plaintext finished handshake message, the plaintext finished handshake message being the result of the client end station utilizing a hash function and a plurality of handshake messages received by and transmitted from the client end station during the handshake; and transmitting, to the WAS over the encryption layer connection, an encrypted modified finished handshake message instead of the encrypted finished handshake message, the encrypted modified finished handshake message being the result of the security gateway having encrypted a plaintext modified handshake message, the plaintext modified handshake message being the result of the security gateway utilizing a hash function and a second plurality of handshake messages received from and transmitted to the client end station by the security gateway during the handshake, wherein at least one of the second plurality of handshake messages is different than a corresponding at least one of the plurality of handshake messages, and wherein the second plurality of handshake messages include the modified handshake message but not the handshake message.

14. The non-transitory computer readable storage medium of claim 13, wherein the modified handshake message includes fewer cipher suite names than the handshake message.

15. The non-transitory computer readable storage medium of claim 11, wherein the operations further comprise:

forwarding, by the security gateway, a second encrypted connection record sent from the WAS over a second encryption layer connection and destined to a second client end station, to the second client end station over the second encryption layer connection, wherein the second encrypted connection record is not modified by the security gateway.

\* \* \* \* \*